United States Patent [19]
Cuk et al.

[11] Patent Number: 5,815,380
[45] Date of Patent: Sep. 29, 1998

[54] SWITCHING CONVERTER WITH OPEN-LOOP PRIMARY SIDE REGULATION

[75] Inventors: Slobodan Cuk, Laguna Hills; Zhe Zhang, Rancho Santa Margarita, both of Calif.

[73] Assignee: Optimum Power Conversion, Inc., Irvine, Calif.

[21] Appl. No.: 153,667

[22] Filed: Nov. 16, 1993

[51] Int. Cl.[6] .................................................. H02M 3/335
[52] U.S. Cl. ................... 363/16; 363/21; 363/97; 363/131
[58] Field of Search .................... 363/15, 160, 20, 363/21, 95, 97, 131

[56] References Cited

U.S. PATENT DOCUMENTS

| | | | |
|---|---|---|---|
| 4,184,197 | 1/1980 | Cuk et al. | 363/16 |
| 4,257,087 | 3/1981 | Cuk | 363/16 |
| 4,495,554 | 1/1985 | Simi et al. | 363/21 |
| 4,559,590 | 12/1985 | Davidson | 363/21 |
| 4,593,346 | 6/1986 | Nooijen et al. | 363/21 |
| 4,809,148 | 2/1989 | Barn | 363/20 |
| 4,975,819 | 12/1990 | Lannuzel | 363/16 |
| 5,327,333 | 7/1994 | Boylan et al. | 363/21 |

OTHER PUBLICATIONS

B. Manano, "Isolating the Control Loop," Unitrode Switching Power Supply Design Seminar Manual, Dec. 1991 Edition.

S. Cuk, R. Middlebrook, "A General Unified Approach to Modeling Switching DC–to–DC Converters in Discontinuous Conduction Mode," Proceedings of IEEE PESC Conference, Jun. 1977.

L. Dixon, Jr., "Pulse Width Modulator Control Methods with Complementary Optimization," Power Conversion International Magazine, Jan. 1982.

A. Dauhajre and R.D. Middlebrook, "A Simple PWM–FM Control for Independently Regulated Dual Output Converter," Proc. Tenth International Solid State Power Electronics Conference (Powercon 10), Mar. 1993.

R. Mahadevan et al., "A Converter with Three Switched Networks Improves Regulated, Dynamics and Control," Proc. Tenth International Solid–State Electronis Conference (Powercon 10), Mar. 1993.

Z. Zhang, et al., "A High Efficiency 1.8kW Battery Equalizer," Proc. of 1983 Applied Power Electronics Conference, San Diego, Mar. 6–11, 1983.

*Primary Examiner*—Jeffrey L. Sterrett
*Attorney, Agent, or Firm*—A. M. Fernandez

[57] ABSTRACT

The isolated, multiple output, switching converter is created with a number of unique performance characteristics. The converter operates in continuous inductor current mode (CICM) of operation for all load currents from no load to full load on all outputs despite the presence of simple rectifier diodes only on the converter secondary sides. The regulation of output voltages on all outputs against the changes of the input voltage is provided by use of a simple open-loop control circuit connected to the primary side and thus eliminating the need for isolation in the control circuit. The regulation against the load current changes in the single output case is also provided on the primary side by a load current sensing circuit. An additional benefit of the switching converter is in the elimination of the losses and voltage overshoots associated with the leakage inductance of the isolation transformer when operated as pulse width modulated (PWM) converter.

10 Claims, 18 Drawing Sheets

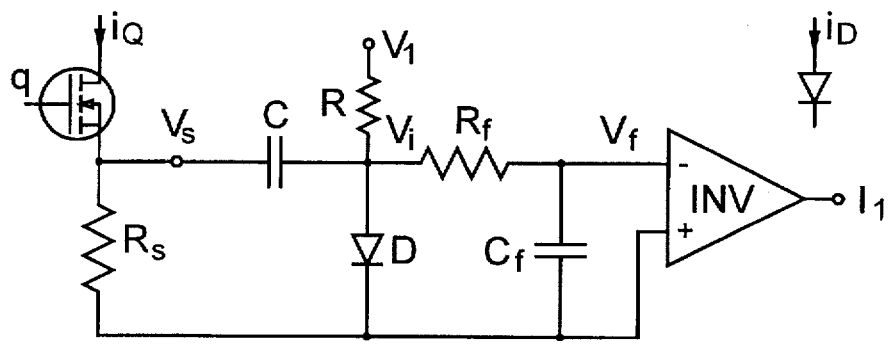
FIG. 21a
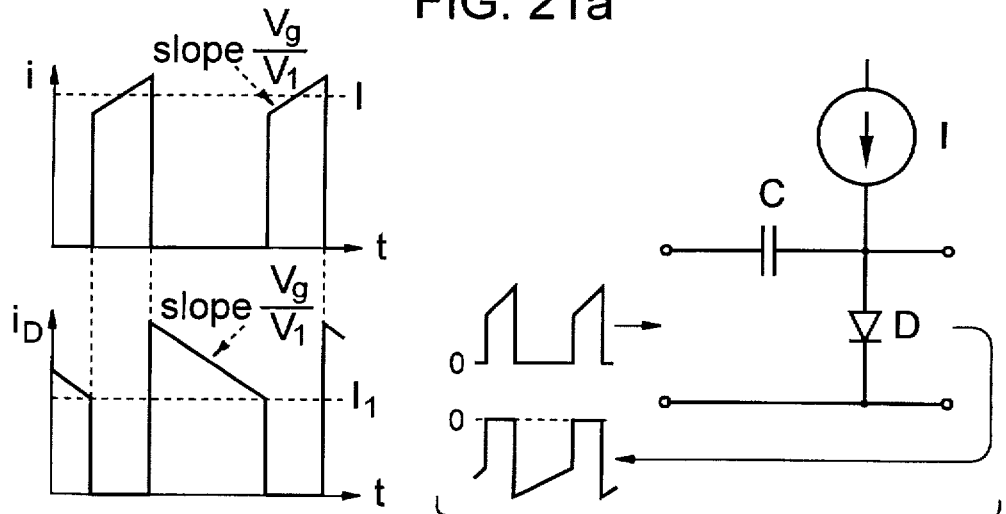
FIG. 21b
FIG. 21c
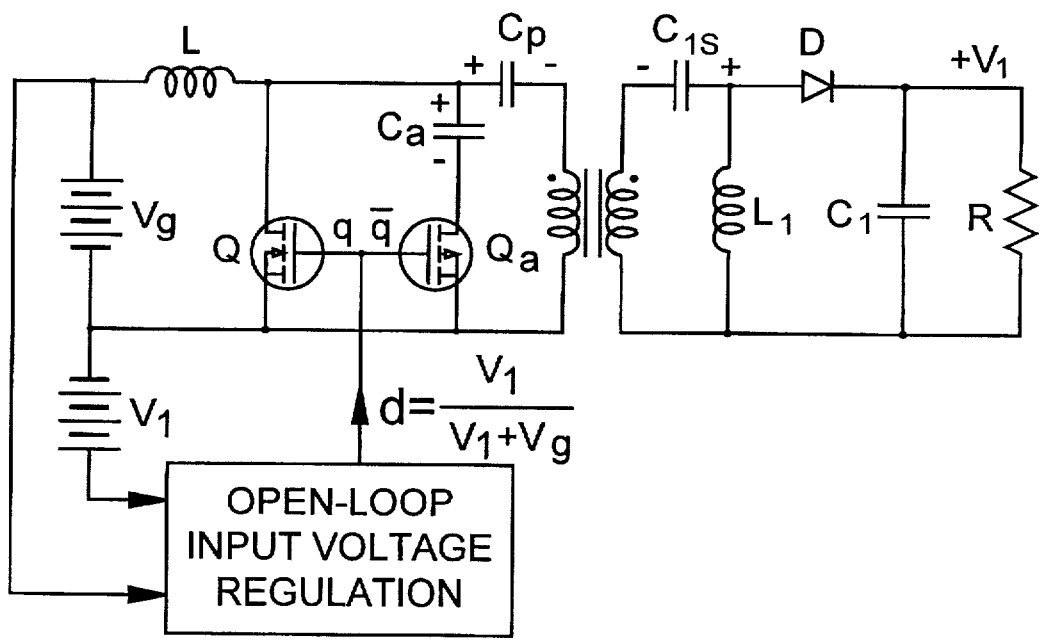
FIG. 22

Test Results

**With P-Channel MOSFET
No Leakage**

| Input: | 14.26V | 1.953A |
|---|---|---|
| Output: | 14.50V | 1.744A |
| Efficiency: | 90.8% | |
| Loss (25W out) | 2.52W | |

| Top trace: | Vds, 20V/div |
|---|---|
| Bottom trace: | Vdiode, 20V/div |
| X: | 2µS/div |

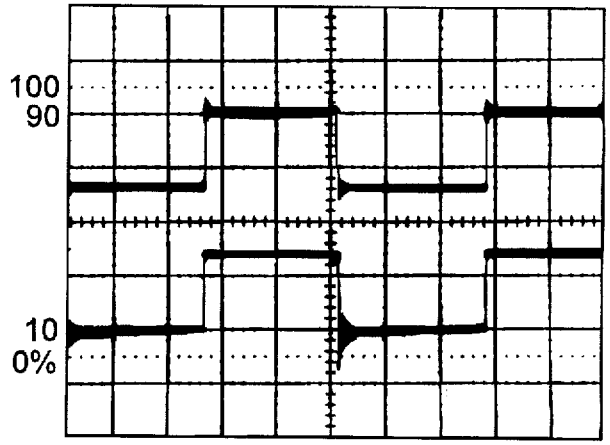

**Without P-Channel MOSFET
2.3µH Leakage**

| Input: | 14.26V | 1.953A |
|---|---|---|
| Output: | 13.22V | 1.723A |
| Efficiency: | 81.8% | |
| Loss (25W out) | 7.78W | |

| Top trace: | Vds, 20V/div |
|---|---|
| Bottom trace: | Vdiode, 20V/div |
| X: | 2µS/div |

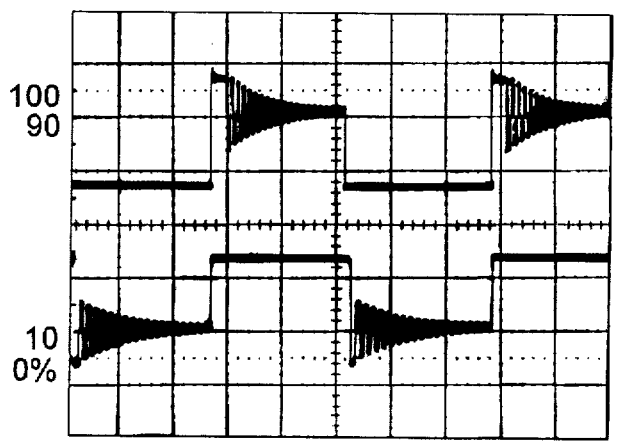

**With P-Channel MOSFET
2.3µH Leakage**

| Input: | 14.26V | 1.925A |
|---|---|---|
| Output: | 12.43V | 1.972A |
| Efficiency: | 89.3% | |
| Loss (25W out) | 2.99W | |

| Top trace: | Vds, 20V/div |
|---|---|
| Bottom trace: | Vdiode, 20V/div |
| X: | 2µS/div |

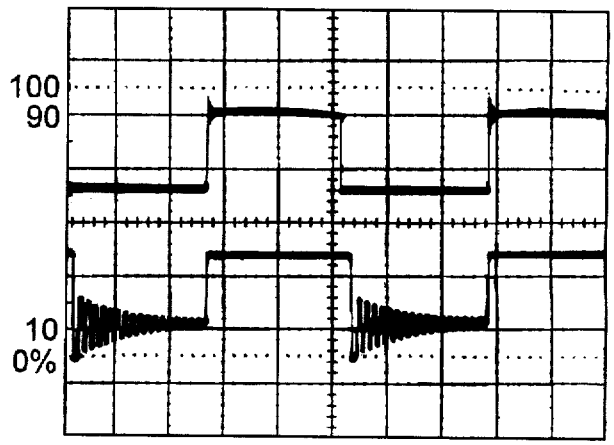

SWITCHING CONVERTER WITH OPEN-LOOP PRIMARY SIDE REGULATION

FIELD OF THE INVENTION

This invention relates to dc-to-dc switching converters having an isolation transformer and primary side control circuit regulating against input voltage changes and load current changes regulation

BACKGROUND ART

A typical switching converter such as the prior art converter of FIG. 1a disclosed in U.S. Pat. No. 4,184,197 has at least four storage components. Even those converters which appear to have only two storage components, such as buck and flyback converter shown in FIG. 5, for example, require the addition of an input filter which effectively converts them into a fourth order system. The resulting control transfer function contains the undesirable right half plane zero's such as seen in FIG. 1b and FIG. 6 which, in turn, lead to closing the feedback loop at conservatively low bandwidth. When the higher bandwidth is desired, complex multiple loop feedback is needed with the potential for instability and oscillations. The main objective of the feedback loop is to regulate the output voltage despite the input voltage and load current variations. One of the objective of the present invention is to achieve good output voltage regulation without employnig the closed-loop feedback, but instead to use an open-loop regulation.

In most practical applications the galvanic isolation between the source and load is required. This is accomplished in an isolated extension of the converter in FIG. 1b disclosed also in U.S. Pat. No. 4,184,197 and illustrated in FIG. 2. This points out another inherent characteristic of this and other standard switching converters. The single controllable switch active transistor is on the primary side, while the controlling quantity, the desired regulated output voltage V1 of the main output is on the secondary side. This requires at least one crossing of the isolation barrier in the feedback circuitry. However, in practice, due to the additional requirements for floating drives, remote sensing etc., the feedback control and drive circuit contains typically five or more feedback isolation transformers and/or optocouplers. Thus, it would be very beneficial to have a switching converter with the minimum number of isolation barrier crossings, and ideally only one in the main power transformer and none in the feedback control and drive circuitry. A number of feedback control methods with varying number of isolation crossings in the feedback path are discussed at length by Bob Mamano in *Isolating the Control Loop*, Unitrode Switching Power Supply Design Seminar Manual, 1991 edition. Thus, one objective of this invention is to create an isolated switching converter which completely eliminates the need for crossing the isolation barrier in the feedback control path, but still achieves the main objective of the feedback control loop and that is the regulation of the output voltage. The side objective is to realize this with the simplest and least expensive control circuits.

Typical switching regulators such as the converters of FIGS. 2–5 are required to maintain the regulated output voltage despite the wide changes in the input voltage and wide load current changes. Of the two disturbances, input voltage variations have a much more significant effect on the duty ratio of the single controllable device, active switch Q on the primary side. For example, a 4 to 1 input voltage change (15 V to 60 V for example) may cause a change of duty ratio from 0.2 to 0.8 or 4 times in the forward converter

2 of FIG. 4 due to its linear DC gain characteristic. On the other hand, a load change of 10 times (from 10% load to full load) causes only a fraction of the change of duty ratio, such as 0.05 or less as long as the converter remains in Continuous Inductor Current Mode (CICM). The small change in duty ratio is just to make a small adjustment in output voltage due to the voltage drop in resistive parasitic losses of the converter. Thus, for a 90% efficient converter, the duty ratio may experience only a 0.05 change, or an order of magnitude smaller change than for input voltage variations. Therefore, another objective is to first provide an open-loop control circuit tied to the primary side which will provide a good regulation against input voltage changes. The second objective then becomes to incorporate additional small correction of the duty ratio to compensate for the voltage drops due to load current changes. This controlling circuit ideally should also be on the primary side despite the fact that the sensed quantity, the load current is naturally on the secondary side. An additional objective would be to realize this without use of current sense transformer, but entirely by non-magnetic signal processing circuits.

Another practical limitation of all Pulse Width Modulated (PWM) switching converters such as converters of FIGS. 2–5 is in the power loss associated with the energy stored in the transformer leakage inductance such as inductance $L_{lk}$ shown in FIG. 2. The abrupt change of the current in the leakage inductance at the instant when primary active switch is Q turning OFF induces the large voltage spike on the switch such as collector emitter voltage waveform $V_{ce}$ shown in FIG. 2. In addition to being the source of undesirable ElectroMagnetic Interference (EMI) noise as well increasing the voltage stress on the switching device, the energy stored on this leakage inductance is dissipated in the converter as a loss. Energy stored is loss per single cycle, thus the total power loss is directly proportional to switching frequency. This becomes a major impediment to reducing the converter size by increasing switching frequency due to among other frequency dependent losses, the loss due to leakage inductance of the converter as well as the parasitic inductance in the critical high current switching loops. Thus, another objective is to create additional circuitry which will redistribute this stored energy in a non-lossy way.

A two output extension of the forward converter in FIG. 3 illustrates another drawback associated with the switching converters. When the load on the main output is so low (light load condition), such that the output inductor peak to peak ripple current is larger than twice the dc load current, the converter enters in the so called Discontinuous Inductor Current Mode (DICM) of operation, in which the voltage gain is not only function of duty ratio, but also depends on the DC load current, inductance values, and switching frequency as described in Slobodan Ćuk and R. D. Middlebrook, "*A General Unified Approach to Modeling Switching DC-to-DC Converters in Discontinuous Conduction Mode*", Proceedings of IEEE PESC Conference, June 1977. Although, the main output would be still regulated at prescribed value, the duty ratio would change to accommodate this mode of operation. As a consequence the secondary output voltage would have decreased substantially from its nominal value. Similarly, when second output enters DICM mode, its voltage would increase. As the result, the nominal 12 V output could vary anywhere between 6 V and 18 V, which is unacceptable in practice. The brute force solution is to pre-load each output with some resistance, which is wasteful. Another solution is to add another buck switching regulator. This adds to the size, weight and cost of the power supply and is generally not practiced except in extreme circumstances. The input power is still processed twice for the second output (cascade connection of forward and buck converters) still resulting in sizable efficiency degradation. For example, with 90% efficiency of each stage, the overall efficiency would be only 81%. Thus, another objective of this invention is to achieve good regulation of all output voltages in a single power conversion stage with multiple outputs and for all loading conditions such as full load through light load to no load on any of the outputs.

Similar problem, although somewhat reduced compared to the forward converter, also exists in the two output extension of the converter in FIG. 2 shown in FIG. 4. In this converter the input and all output inductors all enter DICM mode at the same time as seen later in waveforms of FIG. 10a and thus, some tracking in DICM mode is preserved. This is in contrast to the forward converter of FIG. 3 in which load current on each output at light load causes its own diode to seize conduction and enter DICM mode, thereby causing even more severe cross-regulation problems. Nevertheless, the DC conversion ratio of the converter in FIG. 4 is still fundamentally changed in DICM mode and is also dependent in addition to duty ratio d on the dimensionless parametar $K=2Le\ f_s/R$ where $L_e$ is parallel connection of all inductances and R is load resistance. Thus, DC gain is load current dependent once it enters DICM mode, and a simple dependence on duty ratio d only in CICM mode is lost. Thus, it appears once the DICM mode of operation is entered, this converter will also require a closed-loop feedback in order to regulate the output voltage.

Output voltage regulation against variation of two quantities, that is input voltage variation and output load regulation is typically achieved using single feedback loop such as shown in FIG. 2–4. As the consequence, the response to the input voltage variations, especially over wide input range voltage, results in a transient in the output voltage with sizable overshoot and oscillations. One attempt to improve such response is to add the feedforward compensation to the flyback converter as shown in FIG. 5 by modulating the slope of the otherwise fixed up-going ramp reference signal with appropriate controlling quantity. Thus, the range of duty cycle change is reduced and transient response to input voltage changes is improved. This feedforward control results in virtual elimination of the transient due to input voltage change, but only in the Continuous Inductor Current Mode (CICM) as seen in FIG. 5b. As soon as the converter enters DICM mode at light load and no load, the feed-forward control is ineffective and results in undesirable output voltage transients as shown in FIG. 5c. Despite the non-linear DC gain characterisitc of the flyback converters the improved input voltage transient response is obtained in CICM mode owing to the use of an appropriate optimum feedforward strategy, such as described in Lloyd Dixon, Jr. "*Pulse Width Modulator Control Methods With Complementary Optimization*", *Power Conversion International Magazine*, January 1982. However, as pointed by Dixon, once again, all advantages are lost at light load, when the converter enters DICM mode. In addition, as pointed in Dixon, the very unfavorable frequency response of the control to output transfer function of the flyback converter, having a non-minimum phase response and right half-plane zero, is not eliminated by this feedforward control, and is therefore plaguing this approach even in CICM mode of operation. This is clearly the consequence of the fact that feedforward is always used in addition to and combined with the regular output voltage feedback control. Thus, regulation against the input voltage changes is even in this optimum feedforward control achieved via closed-loop output voltage feedback control with all limitations it imposes. Thus, one motivation of the present invention is to find a suitable switching converter configuration to regulate against input voltage changes in an open-loop fashion, which would entirely by-pass potential stability and oscillation problems as well as provide for an instantaneous and direct adjustment of the steady-state duty ratio in response to the sudden input voltage changes. The feedforward control of FIG. 5 still operates with two variations, that is input voltage variations and output load current variations still coupled through a single feedback loop and complex dynamics of the converter. Thus, another objective is to create a switching converter in which the input voltage variations are decoupled from the load current variations so that the ideal transient response of FIG. 5b for input voltage variations would be obtained for all load conditions from full load to no load, that is regardless of the conduction mode of operation along with the improved frequency response to step input voltage change.

Several approaches have been proposed in the past which provided no load to full load regulation on all outputs in a single power conversion stage. The first approach described in A. Dauhajre and R. D. Middlebrook, "*A Simple PWM-FM Control for Independently Regulated Dual Output Converter*", Proc. Tenth International Solid State Power Electronics Conference (Powercon 10), March 1983, was based on a two-output flyback converter with one output operated in DICM mode, hence sensitive to switching frequency. The full regulation of two outputs was provided by controlling two quantities, duty ratio and the switching frequency of the single active device on the primary side. This method was clearly limited to the two outputs, required isolation in the feedback control circuit and operated at variable switching frequency, which is undesirable from Electromagnetic Interference (EMI) noise standpoint.

Another approach which achieves full regulation of all outputs but with a constant switching frequency is a Three-Switched Network converter proposed by R. Mahadevan, S. El-Hamamsy, W. M. Polivka and S. Ćuk in "*A Converter With Three Switched Networks Improves Regulation, Dynamics, and Control*", Proc. Tenth International Solid-State Power Electronics Conference (Powercon 10), March 1983. In this approach, the additional active switches $Q_1$ and $Q_2$ are added in each of the secondary sides in order to obtain an additional degree of control for each output. The objective in present invention is to achieve good regulation of all outputs from no load to full load but without the additon of active switches on the secondary side, that is still utilizing the simple diode rectifiers on the secondary side.

SUMMARY OF THE INVENTION

The primary objective of this invention is to provide an isolated switching DC to DC converter whose output voltage is regulated against input voltage changes and load current changes by use the open-loop control strategy implemented with the circuit which is completely on the primary side, thus eliminating the need to cross isolation barrier as well as eliminating the stability and potential oscillation problems associated with the closed-loop feedback implementations.

Another objective of the present invention is to develop a single and a multiple output switching converter in which the Discontinuous Inductor Current Mode (DICM) is entirely eliminated, thus resulting in a converter with the same simple DC conversion gain of the Continuous Inductor Current Mode (CICM) dependent on the duty ratio only, and therefore identical performance throughout the load current range from no load to full load.

Yet another objective is to regulate against input voltage changes by use of a control circuit on the primary side and via a simple open-loop control strategy which is effective for entire load current range from no load to full load.

Still another objective is to regulate against the load current changes by use of a load current sensing circuit which is referred to the primary ground as well and also in an open-loop control manner.

Another objective is to reduce the switching losses due to isolation transformer leakage inductance by recirculating the energy stored in the leakage inductance, and thereby improving the conversion efficiency and reducing the stresses on the semiconductor devices.

These and other objects of the invention are achieved in an isolated switching converter comprising an isolated power processing stage and an open-loop control box on the primary side, which regulates against input voltage changes.

The power processing stage comprising on the primary side of the DC voltage source in series with an input inductor L, energy transferring capacitance C and primary winding of the isolation transformer in that sequence and the current bi-directional switch Q connecting the junction of the said inductor L and said capacitor C to the junction between the DC voltage source and the return current path of the transformer primary; and another auxiliary circuit comprising of series connection of current bi-directional switch $Q_a$ and capacitor $C_a$ connected in parallel with the switch Q, and the switching means such that the two switches Q and $Q_a$ are driven out of phase (when one is ON the other is OFF and vice versa), and secondary circuit comprising the secondary winding in series with capacitor $C_{1s}$, output inductor $L_1$ and load and a rectifier diode connecting the junction between the switch $Q_1$ and inductor 1 to the return current path.

The auxiliary circuit $Q_a$, $C_a$ with appropriate switching insures that the converter always operates in CICM mode even at light load and no load, and in this way makes possible implementation of the primary side open-loop regulation using simple analog circuit. This insures outstanding cross-regulation characteristics of the multiple output converters with all outputs providing good regulation characteristics but without added cost, reduction in efficiency and increase in size associated with the addition of the separate switching type buck post-regulators.

The auxiliary circuit could be used alone without the addition of the open-loop primary side control, when the objective is just to reduce the losses due to the energy stored otherwise in the leakage inductance of the isolation transformer as well as to reduce stresses and generated EMI noise.

BRIEF DESCRIPTION OF THE DRAWINGS

FIG. 9b is a scaled version of FIG. 9a

FIG. 21 gives the details of the circuit implementation for FIG. 20.

FIG. 22 is another converter with similar performance characteristics as in FIG. 7.

FIG. 23 gives experimental data confirming the loss reduction with auxiliary circuit.

DESCRIPTION OF PREFERRED EMBODIMENTS

Figure 7A:
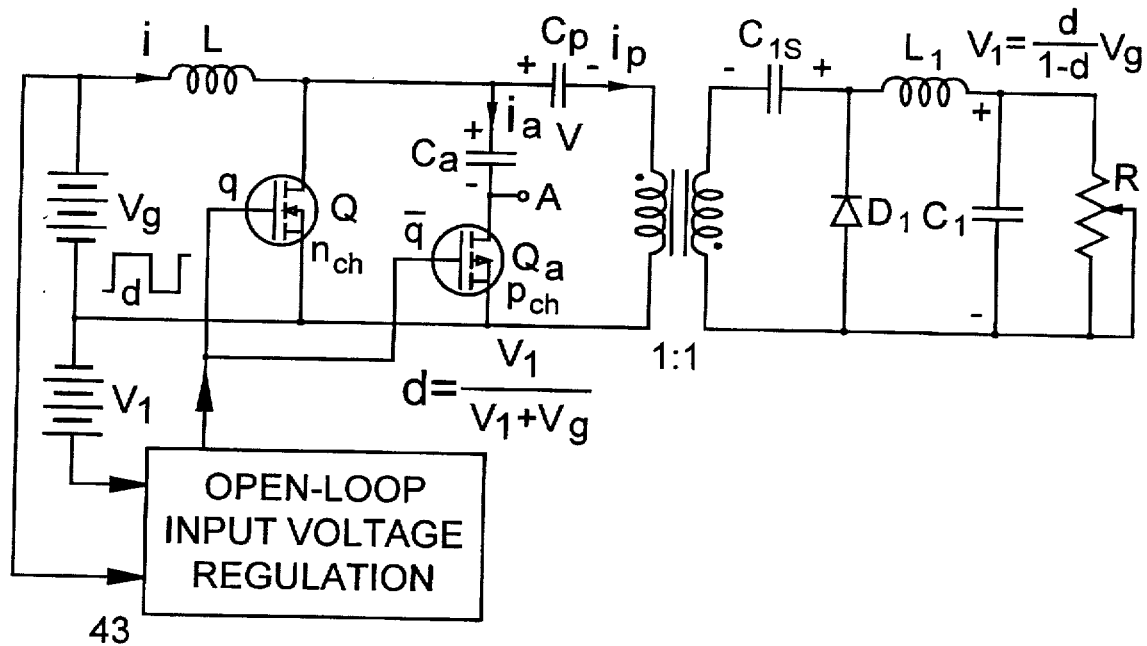
FIG. 7 depicts the first preferred embodiment of the present invention.
Figure 7B:
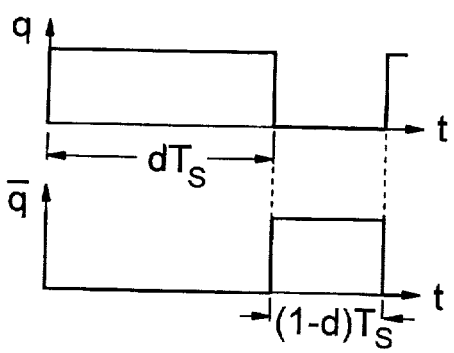

The performance deficiencies outlined for the prior art converters are eliminated in the present invention of the switching converter shown in FIG. 7 which illustrates the First preferred embodiment, showing the isolated switching converter power stage and its primary side control box. This clearly demonstrate the first feature of the converter and that is elimination of the isolation requirement in the control circuit. The switching converter power stage features the auxiliary switch $Q_a$ in series with the capacitor $C_a$ which is added across the primary side active switch Q, which along with the proper driving and control requirements shown in FIG. 7 for the two active switches Q and $Q_a$ is indispensable for proper operation of this converter circuit. The proper operation of the circuit also requires that active switches Q and $Q_a$ be implemented as current bi-directional switches such as MOSFET transistors in FIG. 7 and not as bipolar transistors (current uni-directional switches). Furthermore, the input voltage regulation is achieved in an open-loop manner thus eliminating any potential problems of unwanted oscillations and stability, which would occur had it been regulated in a closed loop fashion. The open-loop control also provides an instantaneous adjustments of duty ratio of primary active switch Q and in conjunction with the auxiliary switch $Q_a$ and capacitor $C_a$ results in ideal no overshoot input voltage transient response for full load, light load and no load conditions.

All performance advantages of the present inventions originate in its unique power stage configuration characterized by the capacitive energy transfer through two capacitors, primary side capacitor $C_p$ and secondary side capacitor $C_{1s}$. For simplicity of explanation the special case of 1:1 turns ratio is chosen although the analysis which follows is directly applicable by appropriate scaling to the general case of an arbitrary transformer turns ratio n:1. Note also that this voltage $V_c$ is also the effective DC input voltage to the secondary side power stage comprising diode D and output filter $L_1$, $C_1$. The analysis of the converter using standard methods, such as Volt-sec balance on inductors results in the following dc conversion gain of the converter $$V_1 = dV_g/(1-d) \quad (1)$$

Figure 7C:
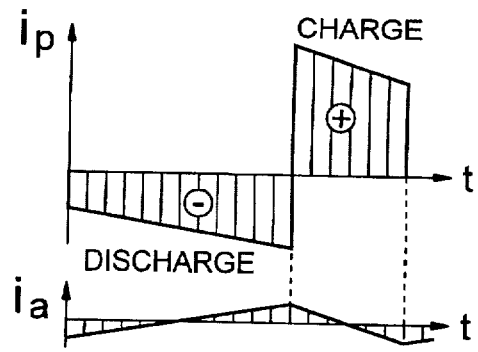

As pointed out earlier, without the auxiliary circuit comprising $Q_a$ and $C_a$ this DC conversion ratio would be applicable only for load currents above some minimal load, and a much more complex DC conversion ratio dependent on the load current would be applicable in DICM. The addition of auxiliary circuit, eliminates the DICM mode of operation in the converter of FIG. 7 for all loads even at no loads. As seen in FIG. 7c the auxiliary circuit conducts only an ac ripple component of the current, while the primary energy transfer capacitance processes the square-wave like current dependent on the DC load current $I_1$. The ultimate result is that the output side despite the presence of the unidirectional switch component such as diode $D_1$ never goes into DICM mode of operation. This is due to the unique capacitive energy transfer mechanism of this special switching structure in conjunction with the auxiliary circuit. The mechanism by which this unique feature is provided will be further explained in later diagrams. The important result is that the same simple DC gain expression given by Equation (1) applies for the entire load current range. This now opens up the possibility of a simple and very attractive open-loop control strategy since it naturally avoids the stability and oscillation problems associated with closed loop feedback systems as well as inherent voltage overshoots associated with the second order or higher order non-minimum phase systems.

The open-loop control strategy for this converter can be easily derived from its non-linear gain step-up/step-down function in equation (1) as:

$$d = V_1/(V_1 + V_g) \quad (2)$$

Note that in the above expression the voltages $V_g$ and $V_1$ are input quantities and as such designated by inward pointing arrows in the open-loop control box of FIG. 7. The duty ratio calculated according to Equation (2) is then the output quantity and as such designated with an outward pointing arrow.

As in all-open-loop controls, one possible and relatively straightforward implementation is to compute according to the control law Equation (2) the needed duty ratio d for any given variable input voltage $V_g$ and desired constant voltage $V_1$. Such an implementation could comprise of converting input voltage into a digital signal via Analog to Digital converter, and compute discrete duty ratio from according to Equation (2) or to make a custom Analog to Discrete duty ratio controller. These methods could become more attractive in the future with more advanced and less costly digital signal processing technology and custom IC solutions. However, at the present level of technology, a simpler and more practical implementation is to use standard analog circuit components such as comparators, and/or operational amplifiers to synthesize the control strategy Equation (2).

Figure 8A:
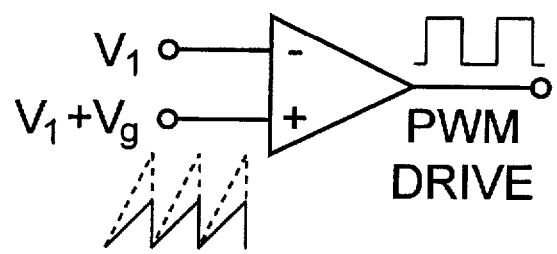
FIG. 8 represents a simple analog circuit implementation of open-loop control strategy for the converter in FIG. 7
Figure 8B:
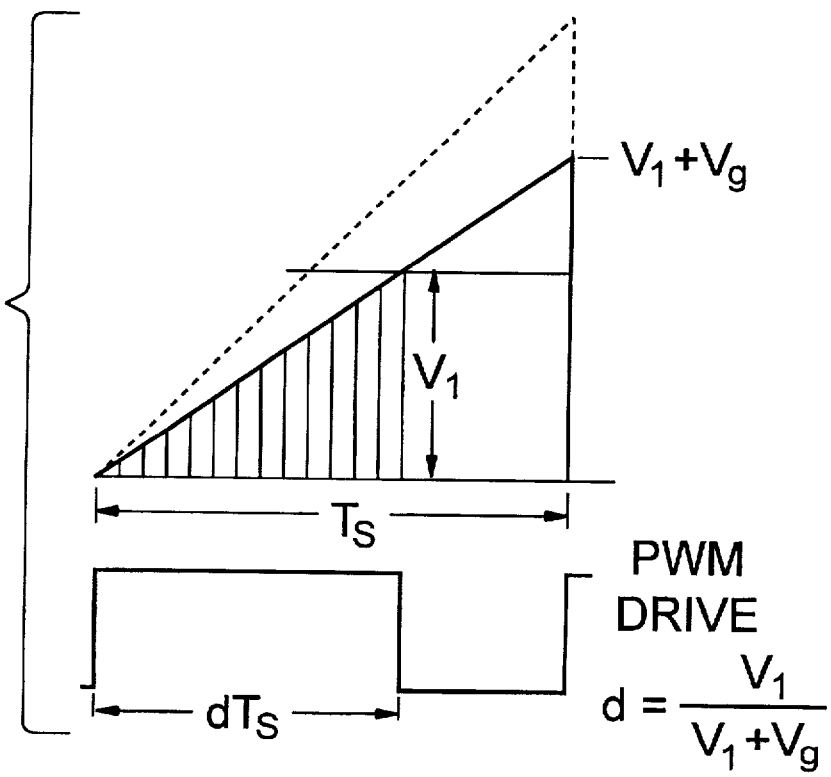
Figure 9A:
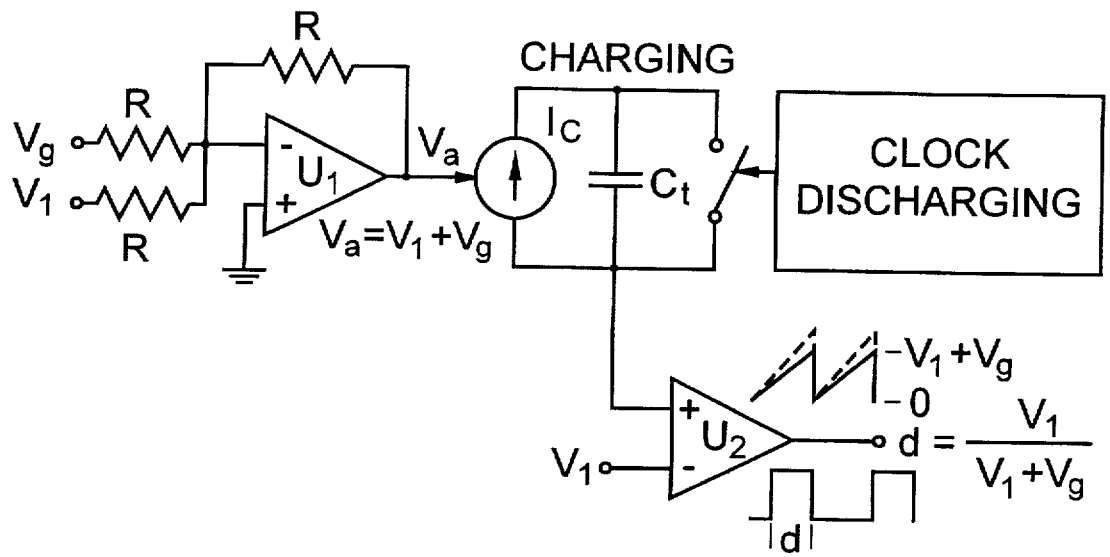
FIG. 9a is another practical implementation of the open-loop control box in FIG. 7.
Figure 9B:
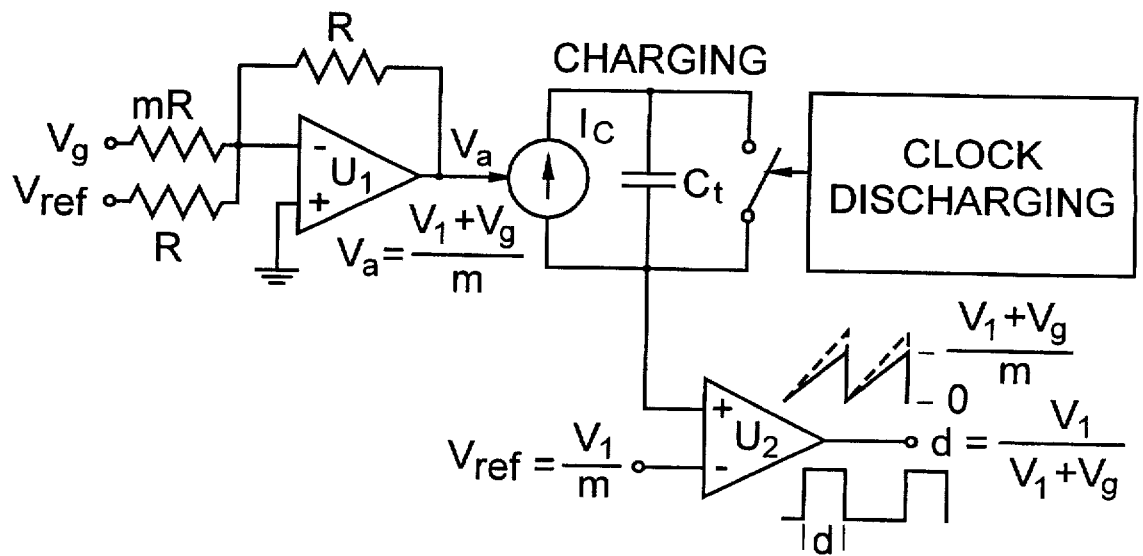

One such possible implementation is shown in FIG. 8 using a simple comparator. One input to the comparator is the sawtooth with the variable slope dependent on quantity $(V_g + V_1)$. The other input is the desired output voltage $V_1$. The similarity of the shaded triangle with the large triangle leads directly to the control law (2). However, the use of an additional operational amplifier such as in FIG. 9a leads to a more practical realization which uses ordinary up-going ramp, but still with the slope dependent on the quantity $V_1 + V_g$ as shown by the slope with dotted lines. The variable slope is accomplished by use of the current source whose magnitude is proportional to this quantity. Then by use of the standard methods used in IC switching regulators, this constant current source is charging the timing capacitor $C_t$ to generate the sawtooth ramp, which is terminated when the capacitor $C_t$ is discharged rapidly at the instants prescribed by the fixed clock frequency. The implementation in FIG. 9a has as input variables $V_1$ and $V_g$ and as output needed duty ratio d and thus represents one possible direct realization of the primary side control box designated Open-Loop Input Voltage Regulation in all figures. Another even more practical realization is shown in FIG. 9b which is the scaled version of that in FIG. 9a. The key feature of this implementation is that it features a fixed reference voltage $V_{ref}$. This is the preferred realization because the readily available commercial IC regulator chips have built in the stable internal reference voltage $V_{ref}$. Some of the IC regulator chips, such as from Phillips, Siemens, and others have also a provision for modulating the magnitude of the built-in current source and could be directly used for above implementation. The desired voltage $V_1$ in FIG. 9b is then selected by choosing the appropriate multiplier m, where $$V_1 = mV_{ref} \quad (3)$$

Figure 1A:
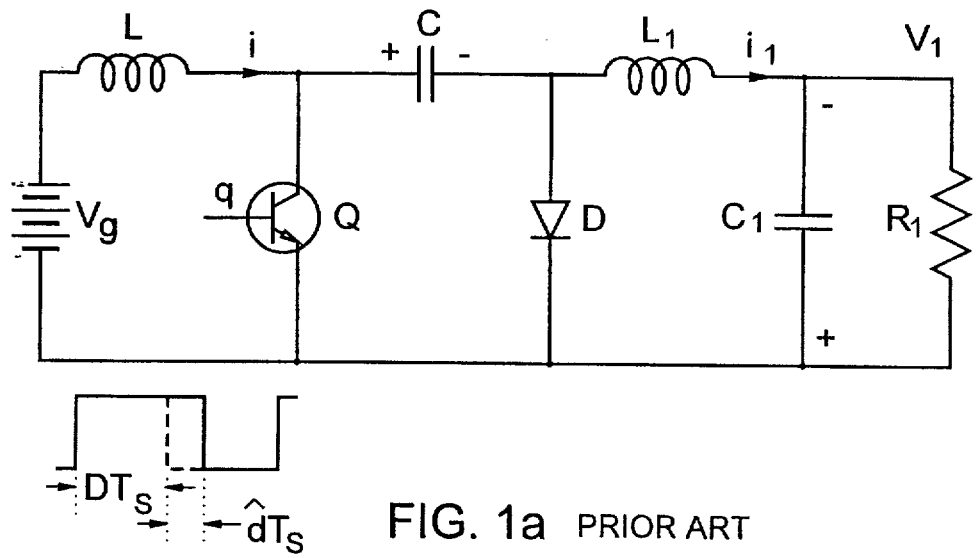
FIG. 1a is the prior art converter disclosed in U.S. Pat. No. 4,184,197.
Figure 1B:
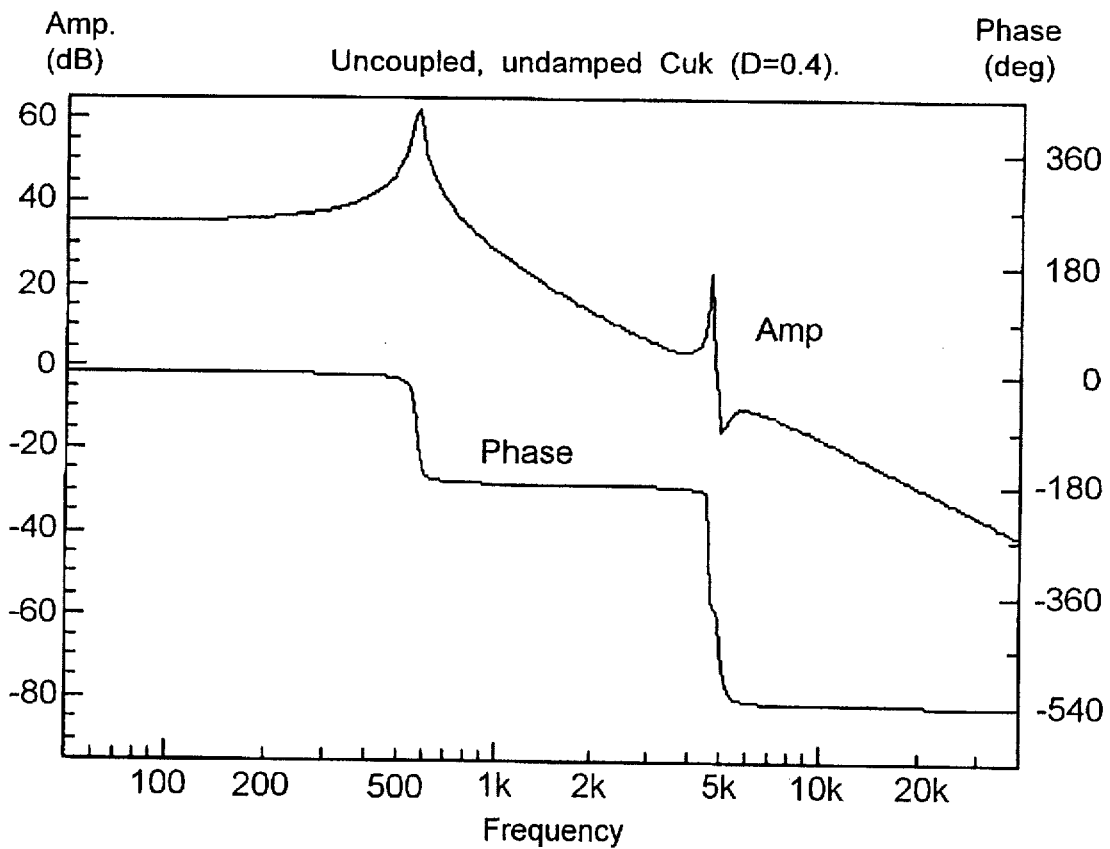
FIG. 1b is the typical frequency response of this converter.
Figure 5A:
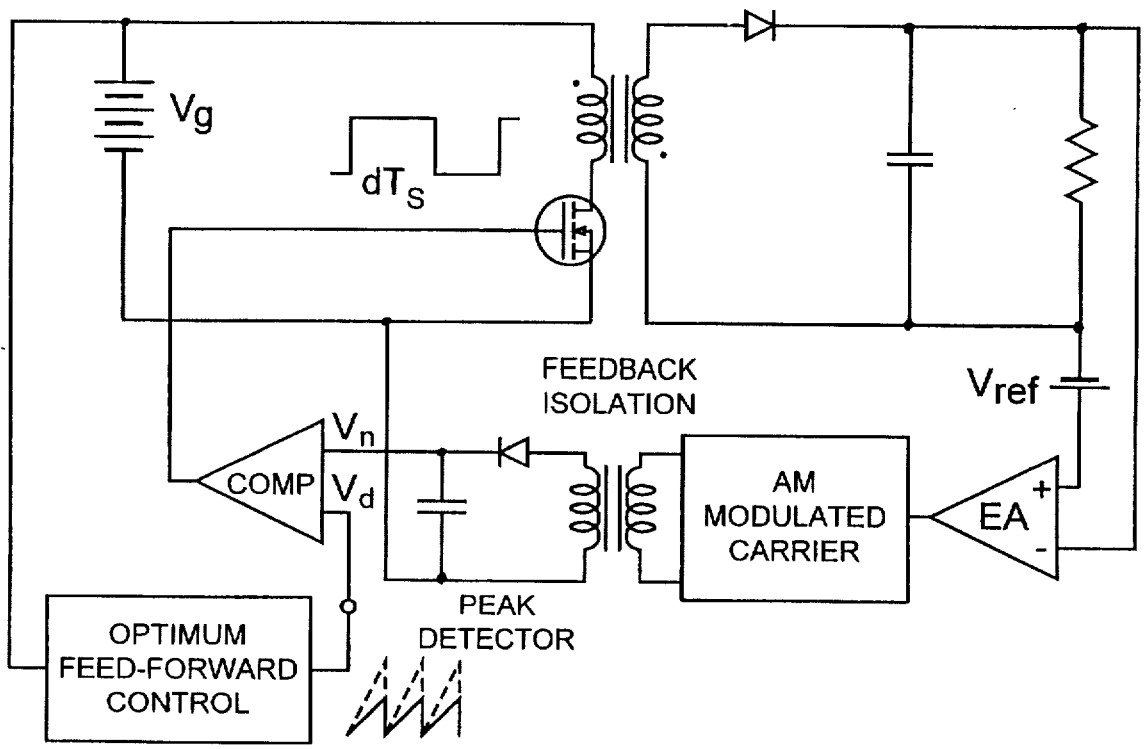
FIG. 5 displays the feed-forward control of the flyback converter which improves transient response to input step voltage change but only in CICM mode.
Figure 5B:
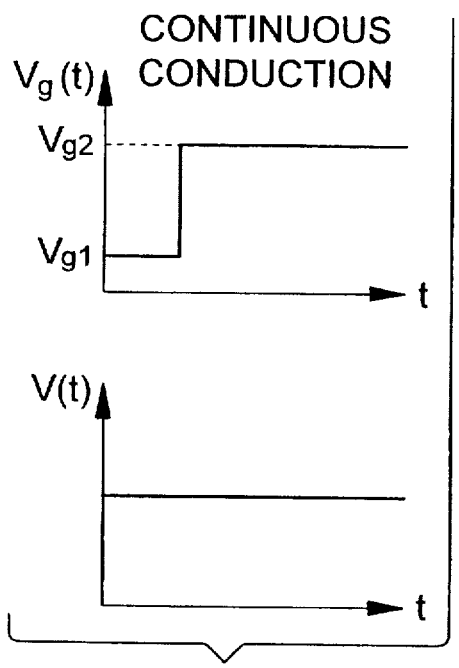
Figure 10A:
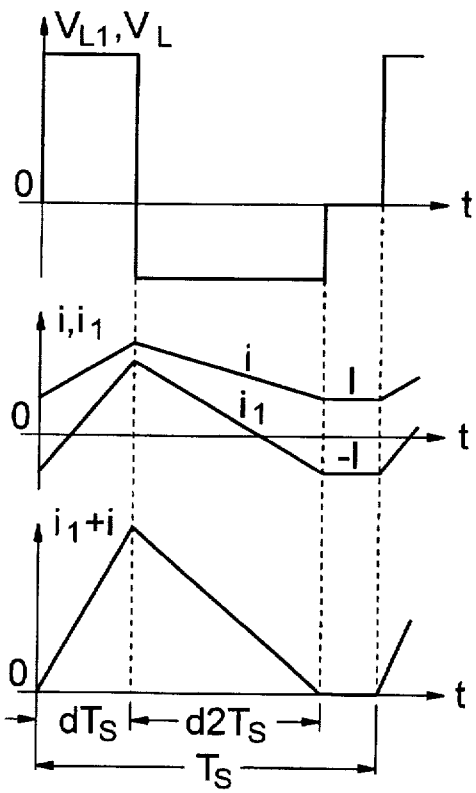
FIG. 10 displays the characteristic waveforms at light load of converter in FIG. 2 and FIG. 7.
Figure 10B:
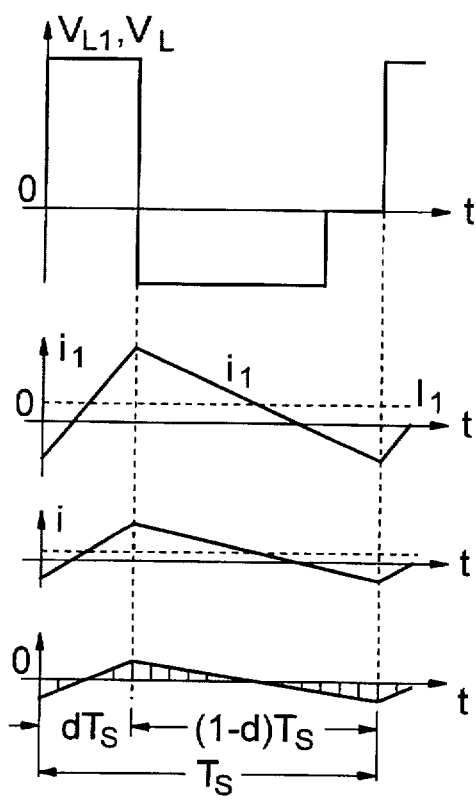
Figure 11A:
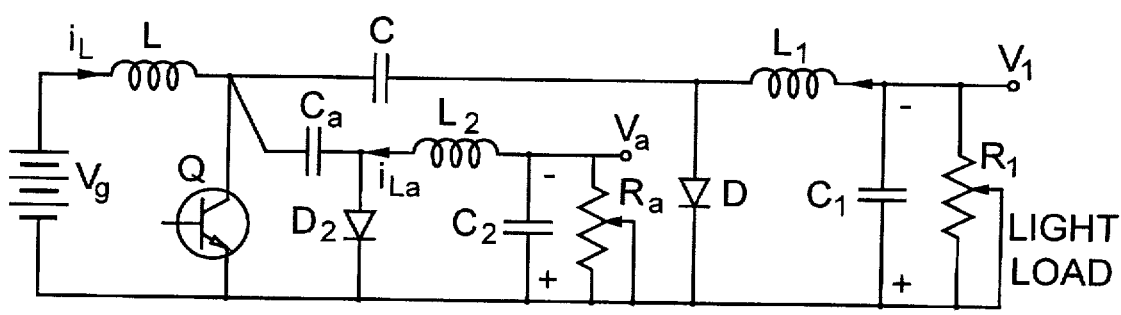
FIG. 11 illustrates a two output circuit model used in the explanation.
Figure 11B:
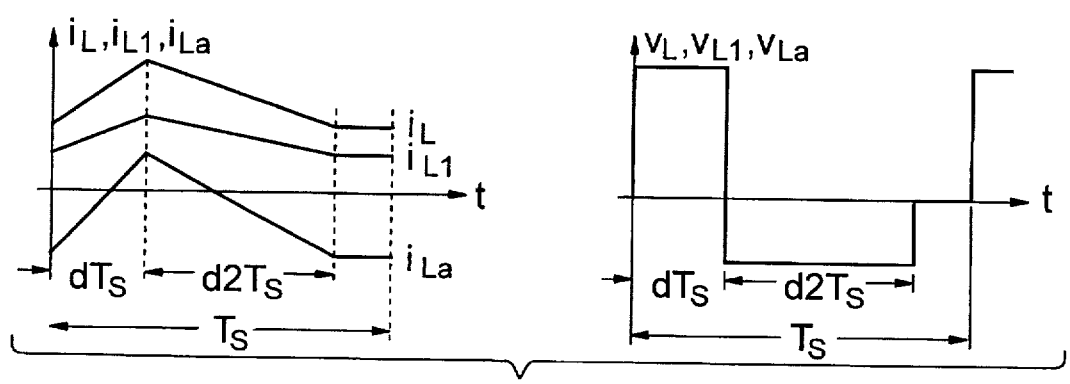
Figure 12A:
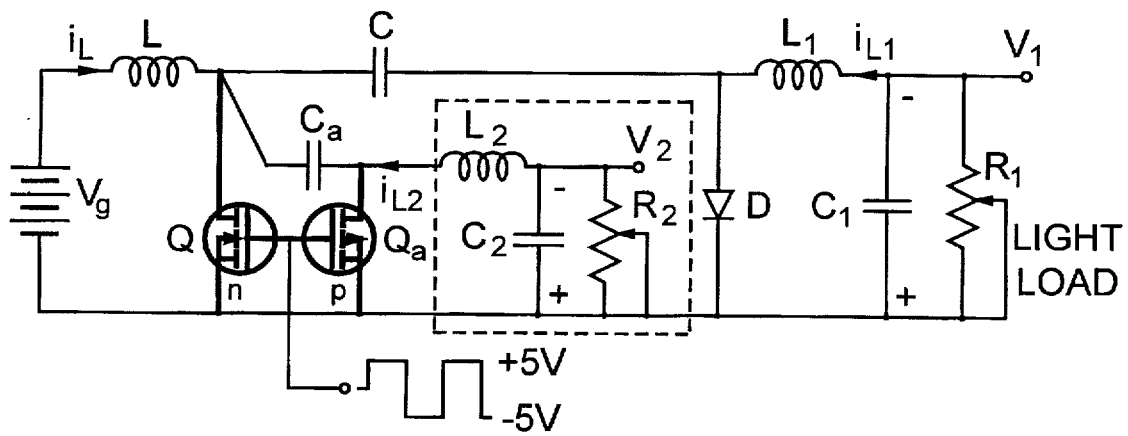
FIG. 12 illustrates an explanation of the elimination of DICM in output inductor.
Figure 12B:
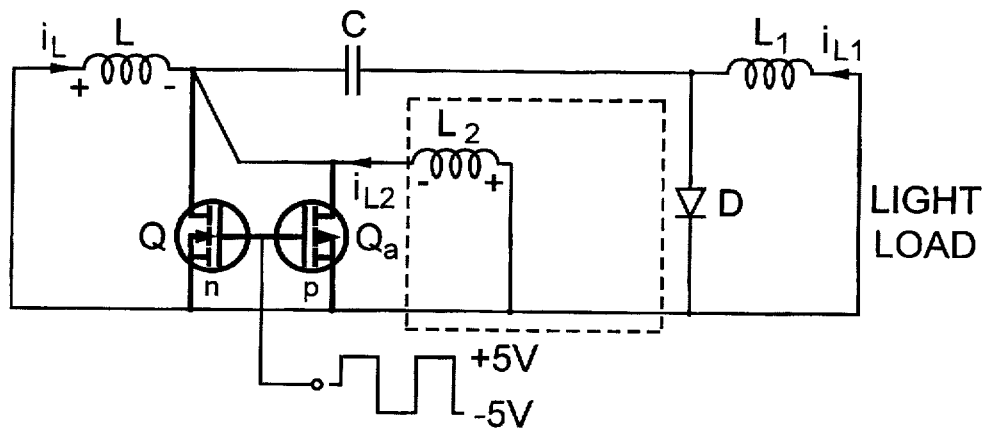
Figure 13A:
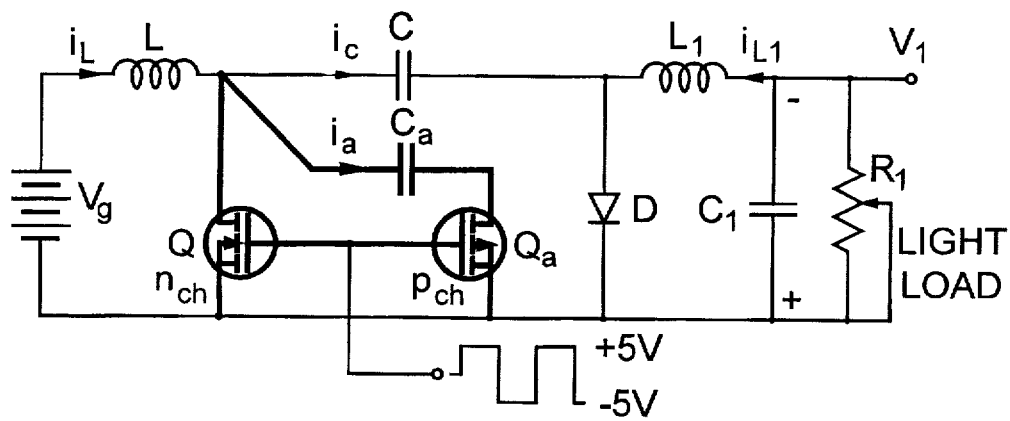
FIG. 13 illustrates explanation of the typical waveforms generated by the auxiliary circuit.
Figure 13B:
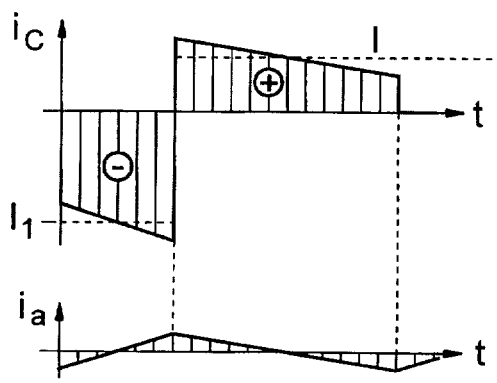

Comparison of the current waveforms at light load and/no load between the prior art converter of FIG. 5 shown in FIG. 10a and the corresponding current waveforms in the present invention of FIG. 7 illustrated in FIG. 10b reveals the profound effect that the auxiliary circuit $Q_a$ and $C_a$ has on the waveform and operating mode of the converter. The key difference is the existence of the third interval in the converter of FIG. 5 during which the diode is turned OFF, while in the converter of FIG. 7 only two distinct switching intervals exists even at light load and no load. To best understand such a unique feature of the operation, the two output version of the converter in FIG. 1 is shown in FIG. 11a. Due to capacitive energy transfer at light load, both input and output inductors enter DICM mode at the same instant in time. This is also the case when an additional output $V_2$ is added and all three inductor currents feature the same distinct third interval as seen in waveforms of FIG. 11b, while the voltage waveform on all three inductors has the characteristics of the DICM mode with three distinct intervals. If transistor Q and diode $D_2$ are now replaced with the current bi-directional switches MOSFET transistors Q and $Q_a$ which are driven out of phase, the circuit of FIG. 12a. Thus, because of the presence of the current bi-directional switches Q and $Q_a$, the converter with second output $V_2$ and input inductor L and output inductor $L_2$ are forced to operate in CICM mode regardless of the DC load currents on either of the two outputs. By considering now the capacitors in FIG. 12a as ac short circuits at high frequencies, an equivalent circuit model of FIG. 12b is obtained. This model clearly exposes that the voltage waveforms on all three inductors have to be identical since in the ac model of FIG. 12b they are all connected in parallel. Since the first two inductors already exhibited CICM characteristic waveforms, so the output inductor $L_1$ on the main output must do so despite the presence of the unidirectional current switch, the diode D. In the special case of zero DC load current on output $V_2$, the corresponding low pass filter $L_2, C_2$ can be also eliminated to result in the final circuit of FIG. 13a. The net result is that the current in the auxiliary branch no longer has a square wave component corresponding to previous load current $I_2$, but only the triangular component, which now has zero average. In other word, the input inductor ripple current is now passing through the auxiliary branch, while the DC component of the input current is being processed in a switched manner to the main output $V_1$. This square-wave component of current in capacitor C is shown in FIG. 13b along with the triangular component of capacitor $C_a$ current $i_a$.

Figure 12C:
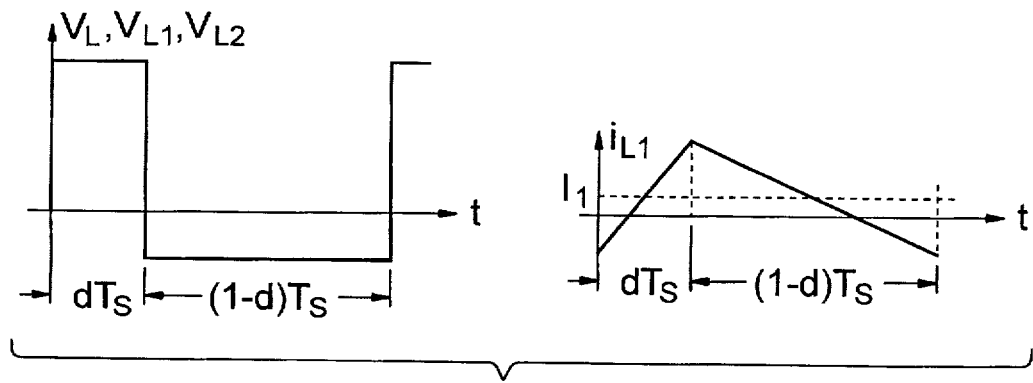

Both active switches have to be current bi-directional switches, such as MOSFET transistors, and are driven alternately, when one is ON, the other is OFF and vice versa. In implementation of FIG. 12 switch Q is n channel MOSFET, while switch $Q_a$ is p channel MOSFET. Thus, their gates could be connected together as in FIG. 11 and driven from a common bipolar voltage drive (say +10 V to −10 V square-wave drive). Note that in other unipolar drive waveforms in enclosed figures, the positive voltage means device is ON while the zero voltage means it is OFF even though negative actual voltage is used to turn a p channel device ON. This connection has an advantage of providing an automatic protection against overlapping conduction of two devices, thus eliminating the circulating current which would appear when both devices are ON at the same time. In other practical application, especially higher power and/or higher voltage, due to unavailability of higher rated p channel MOSFET devices, the n channel devices could be used for auxiliary switch. In that case, the floating drive is necessary and the devices are driven from the control circuit with properly designed drives having a minimum dead time to prevent overlapping conduction of two devices.

Figure 13C:
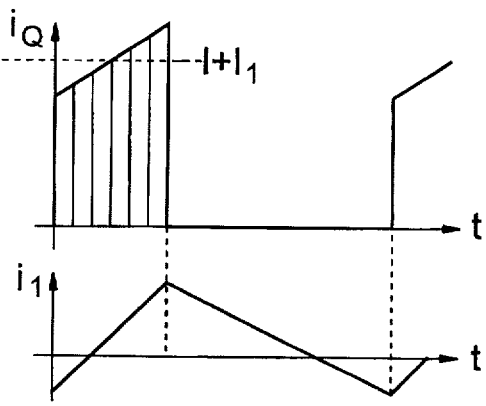

The remaining practical question is what is the penalty one might pay in terms of efficiency and cost for such auxiliary switch $Q_a$ and capacitance $C_a$ addition in order to preserve simplicity of the open-loop regulation Equation (2). The typical current waveforms of the two active switches Q and $Q_a$ are shown at full load in FIG. 13b and FIG. 13c. Note that main switch Q contains the large square wave part due to the power processed to the main output V1 as seen in the switch current waveform in FIG. 13c. The auxiliary switch $Q_a$ only passes the ac ripple component seen in FIG. 13b. If the ripple current is only 10% of the DC load current, the effective (rms) value of the auxiliary switch current can easily be 5 to 10 times smaller than effective (rms) value of the main switch, thus making the loss of the auxiliary switch with comparable ON resistance only 1% to 4% of the main switch loss. Thus, auxiliary switch with significantly higher ON resistance (and corresponding lower cost and smaller size) could be utilized. Similarly, the auxiliary capacitor will carry rms current which is 5 to 10 times smaller. Hence capacitors both with an order of magnitude smaller ripple current ratings, as well appropriately reduced values could be utilized. Hence, the size and cost of the auxiliary capacitor is equally attractive.

Figure 14:
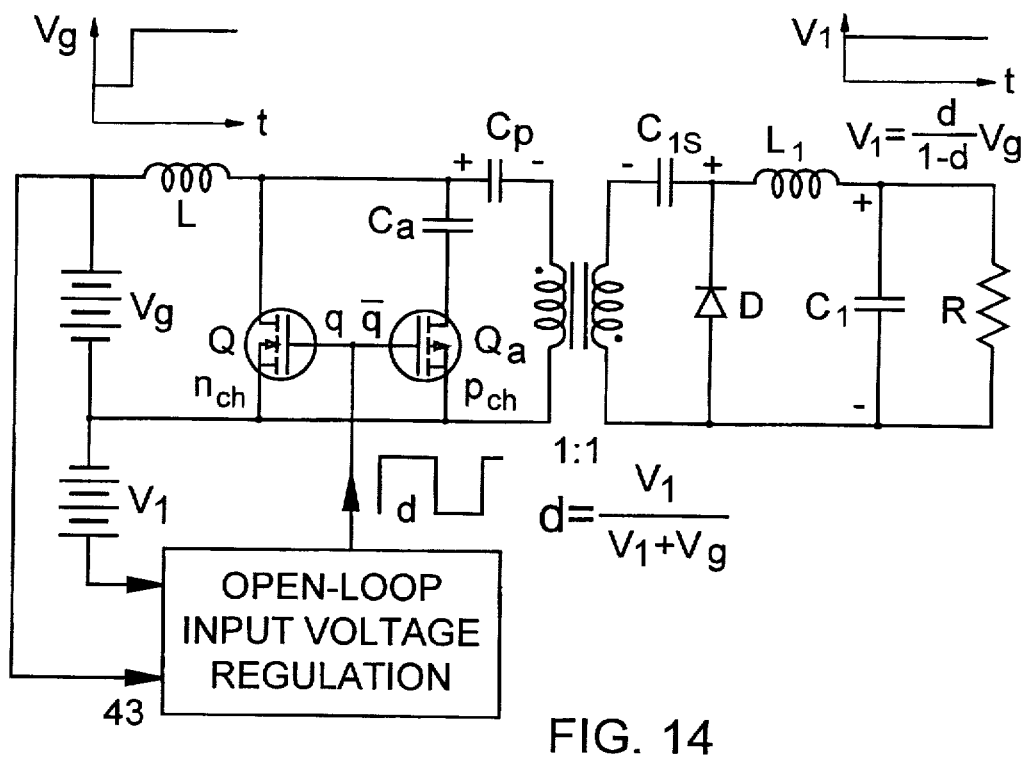
FIG. 14 illustrates the performance improvements for step input voltage change.

It is now obvious that the same auxiliary circuit can be applied with equal success to the isolated converter of FIG. 7 and FIG. 14. Note once again, that the auxiliary $Q_a$ switch once again prevents both the input and the output inductor currents from ever going into DICM mode despite the presence of the secondary diode D1 and light load or no load conditions. One of the key performance features is that the transient response to the sudden changes of the input voltage is much improved. As seen in FIG. 14, output voltage free from the overshoot and oscillatory response is obtained. Moreover, the danger of the stability problems and oscillations is completely eliminated and yet a much faster dynamic response to input voltage changes obtained.

The performance advantages of the open-loop control are obvious. With the open-loop control, the input voltage changes are instantly compensated by control circuit which for each input voltage dictates a corresponding unique duty ratio. Thus, regardless of the load currents (no load to full load), the output voltage transients due to input voltage changes are eliminated as seen in the voltage waveforms in FIG. 14 and an excellent audio susceptibility characteristic is expected. This is also experimentally confirmed.

Figure 5C:
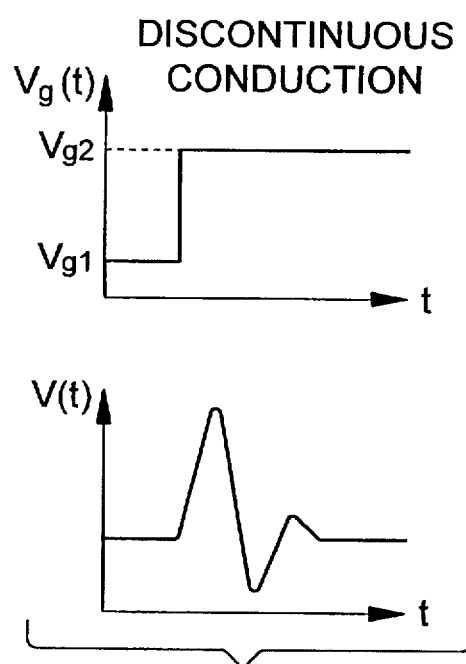
Figure 6:
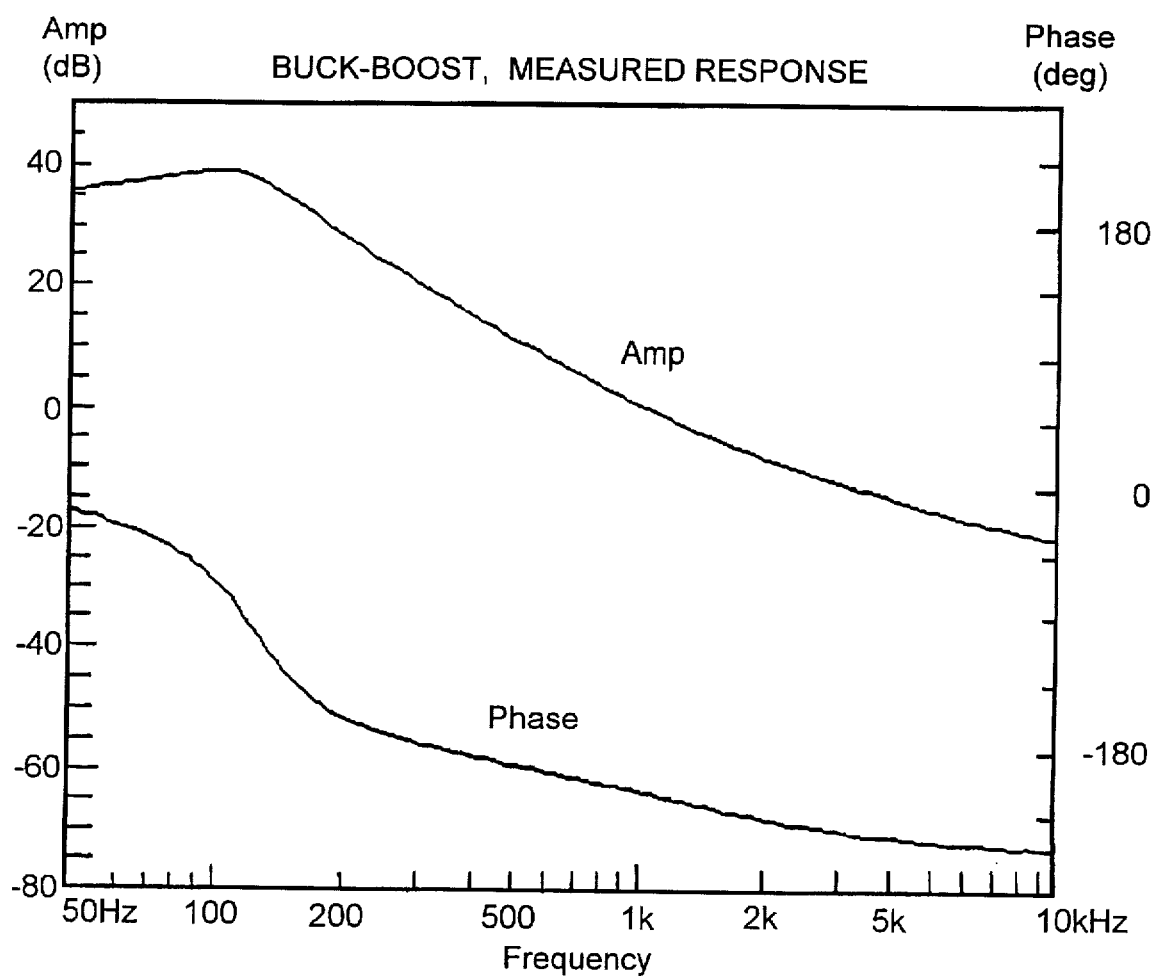
FIG. 6 is the frequency response of the flyback converter of FIG. 5.

It is now interesting to compare this new open-loop control of switching converters with the classical feedforward control illustrated in FIG. 5 for the flyback converter. Large input voltage variations would result in correspondingly large duty ratio variations. The feedforward control is used together with the feedback loop control to improve the transient response due to input voltage changes. As soon as the DICM is encountered at light load, due to more complex load dependent DC gain function, the feedforward control results still in substantial output voltage transients as illustrated in FIG. 5c. The clear distinction can now be drawn between the classical feedforward control and the open-loop control implemented in FIG. 7 and FIG. 14. The feedforward control is intrinsically used only in addition to and combined with the output voltage feedback control in order to improve line transient performance. It can also accomplish this for heavy loads and CICM mode of operation. Furthermore, the very unfavorable frequency response of the control transfer function of the flyback converter (non-minimum phase response of FIG. 6) is still present even in CICM mode of operation and is not eliminated by the feedforward method.

SECOND PREFERRED EMBODIMENT

Figure 15A:
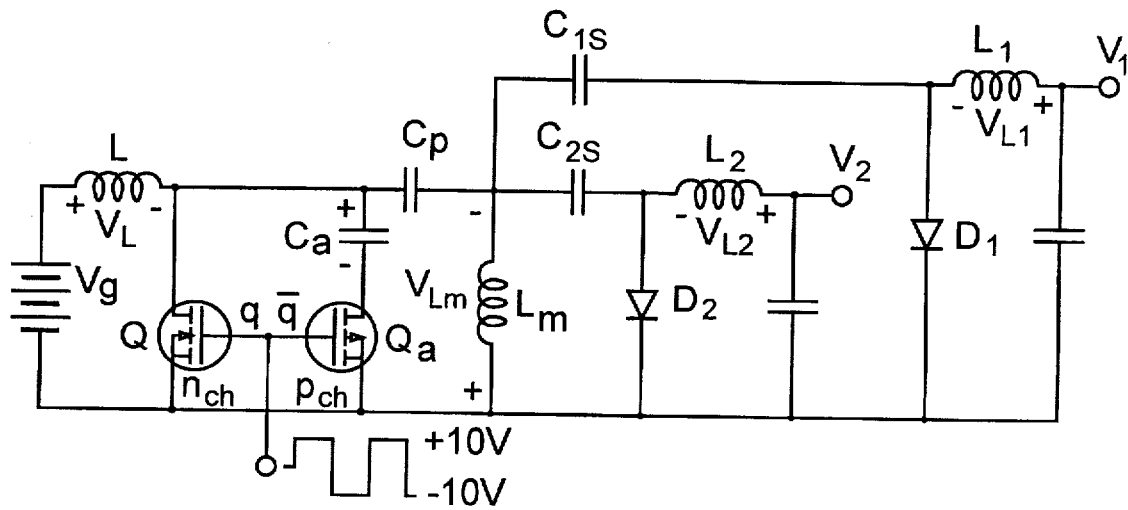
FIG. 15 explains how the DICM mode is eliminated from all outputs in the multiple output extension.
Figure 15B:
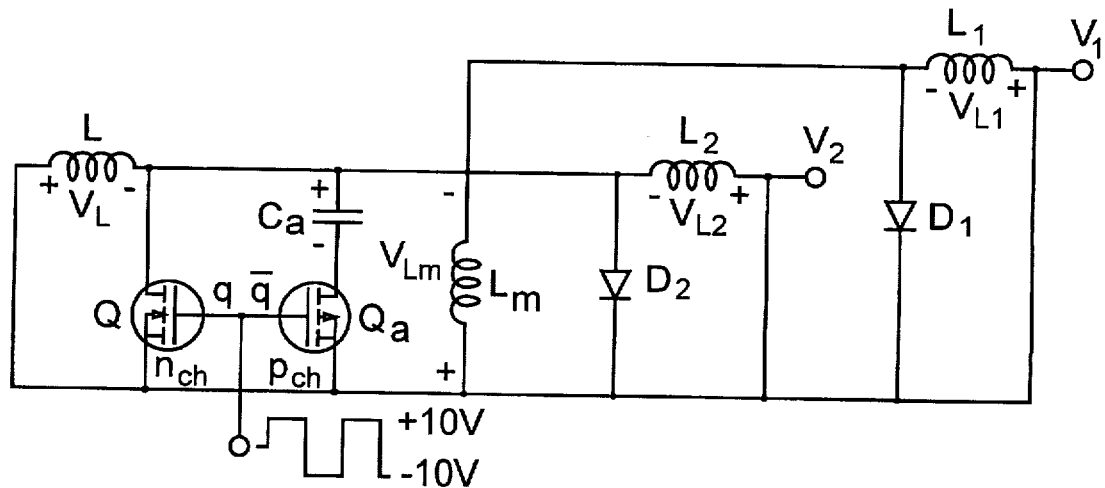
Figure 15C:
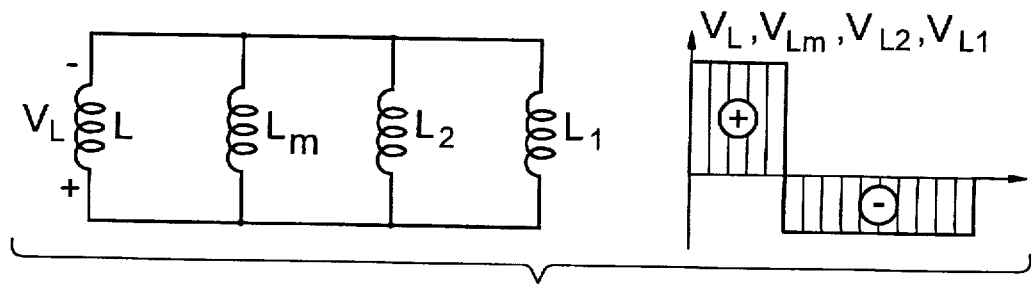

The unique performance feature of the single output switching converter can now be generalized to the two output and multiple output converters as illustrated in FIG. 15a. In this figure, the isolation transformer is modeled by its magnetizing inductance $L_m$, and the two outputs are considered. Once again the auxiliary circuit $Q_a, C_a$ imposes CICM voltage waveform on the input inductor L, because of the capacitive coupling inherent in the converter operation. On the other hand, the ac model of FIG. 15b obtained by shorting all capacitors clearly demonstrates once again, that all inductors are in parallel as seen in FIG. 15c thus sharing the same voltage waveform as the input inductor. Since input inductor is always in CICM mode so are also all the other inductors.

Figure 16:
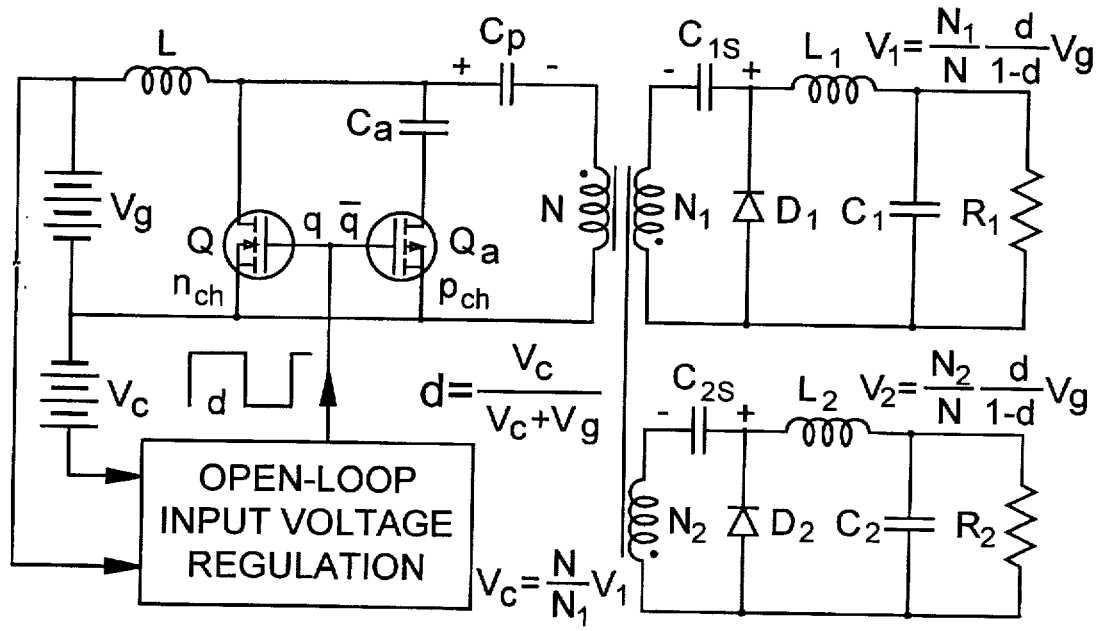
FIG. 16 depicts a two output extension.

The two output extension of the present invention is shown in FIG. 16. The key performance advantage is obtained in that all output voltages are regulated against the changes of the input voltage and the problems associated with the switching converters at minimum and no loads are entirely eliminated. This is obtained without any additional controlled switching devices on the secondary side, which still features the same simple diode rectifier implementation.

THIRD PREFERRED EMBODIMENT

Figure 17:
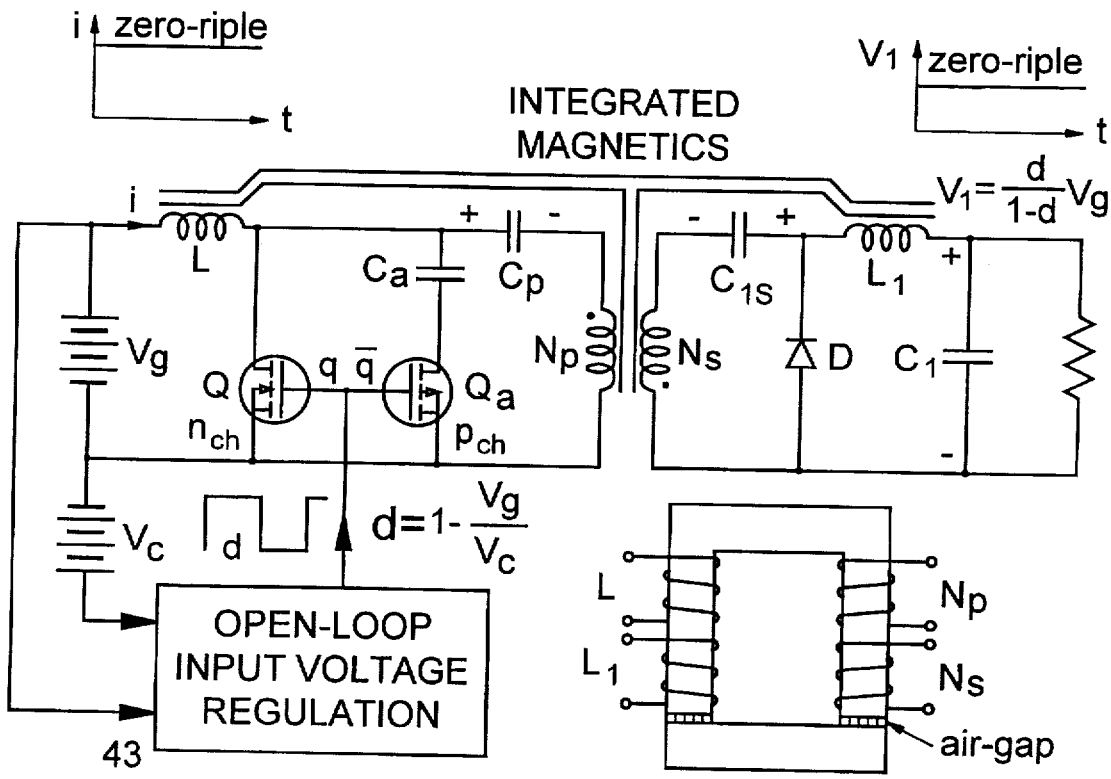
FIG. 17 represents Integrated Magnetics extension

The voltage waveforms of the input inductor, isolation transformer and the output inductor are identical. Thus, both inductors and the transformer can be integrated on the common core and both input and output inductor currents ripples shifted into the transformer, thus resulting in near zero ripple input and output current as shown in FIG. 17 and as described in U.S. Pat. No. 4,257,087. However, all the advantages obtained by the open-loop control and elimination of DICM mode of operation disclosed by this invention can still be practiced.

FOURTH PREFERRED EMBODIMENT

Figure 2:
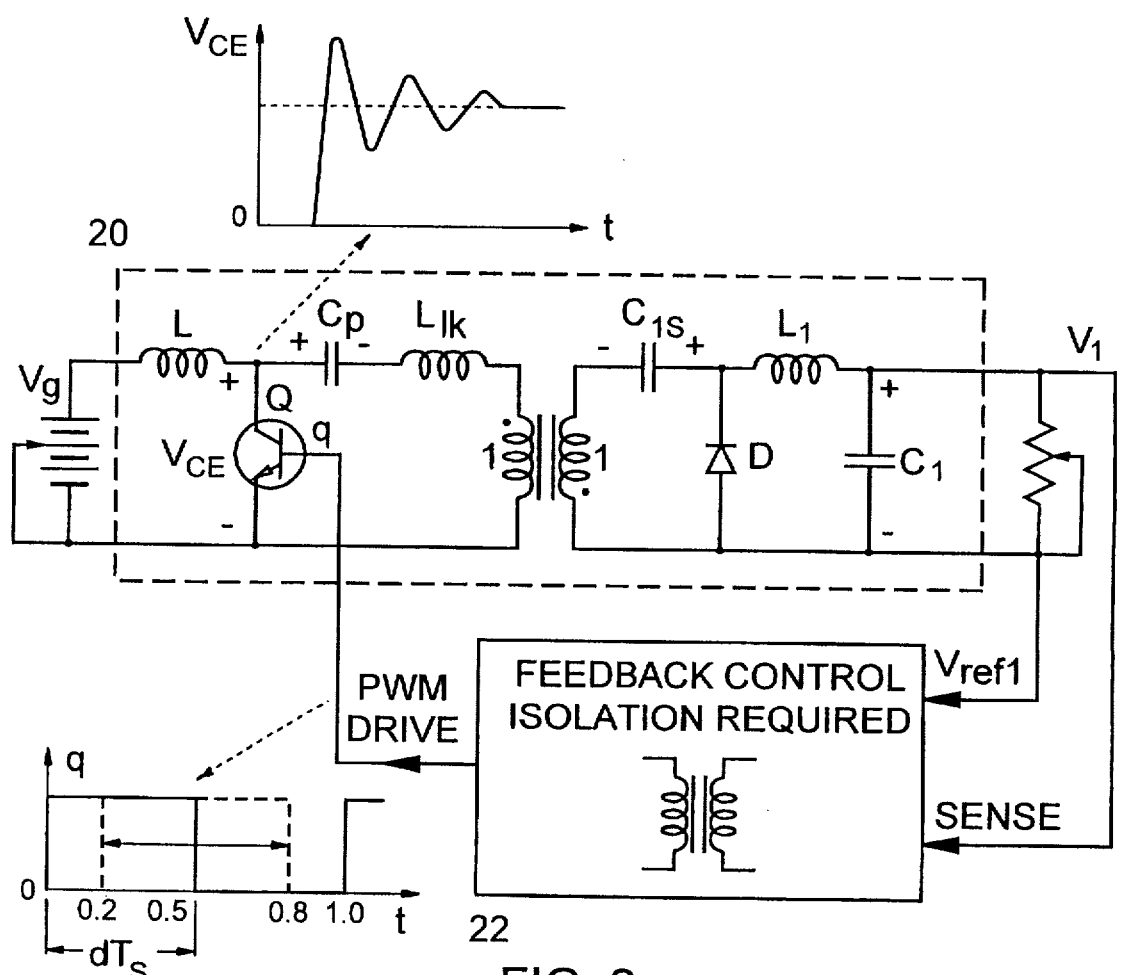
FIG. 2 represents the isolated version of the same converter also disclosed in U.S. Pat. No. 4,184,197. The isolation in the feedback is required and the leakage inductance of the isolation transformer leads to additional loss and transistor voltage overshoot.
Figure 3A:
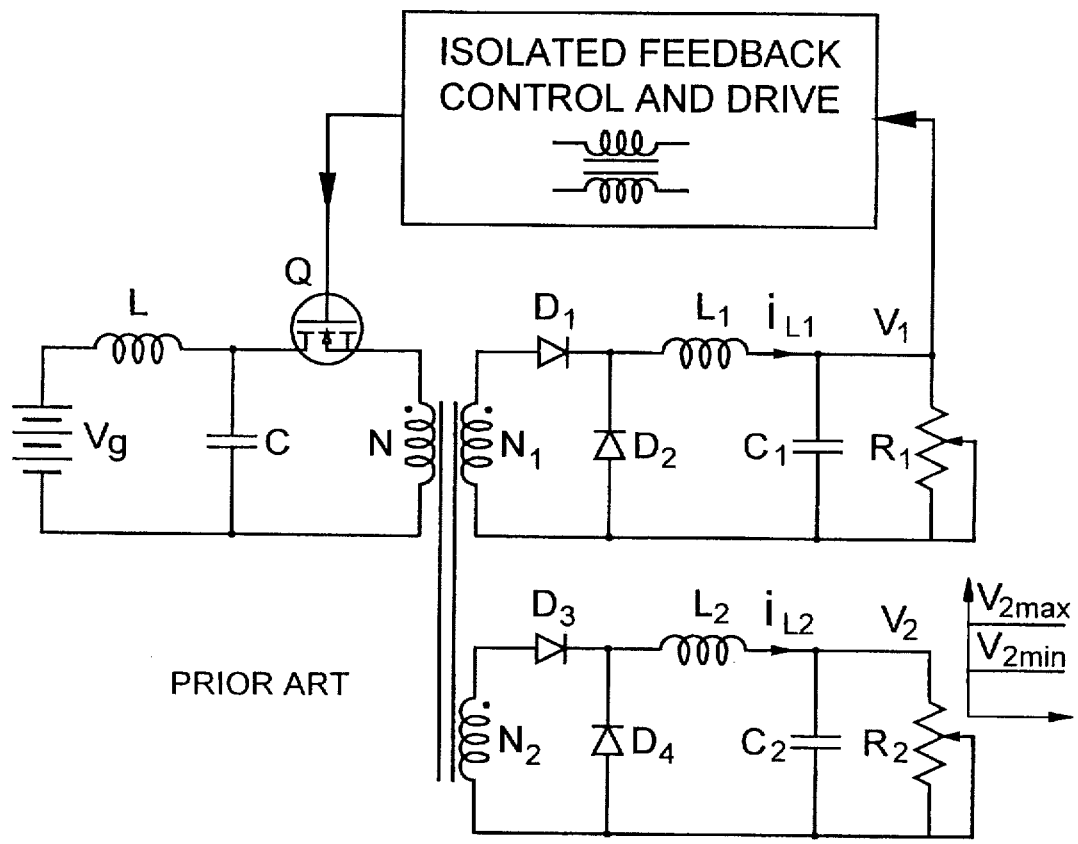
FIG. 3 is a schematic of the prior art isolated switching converter with two outputs.
Figure 3B:
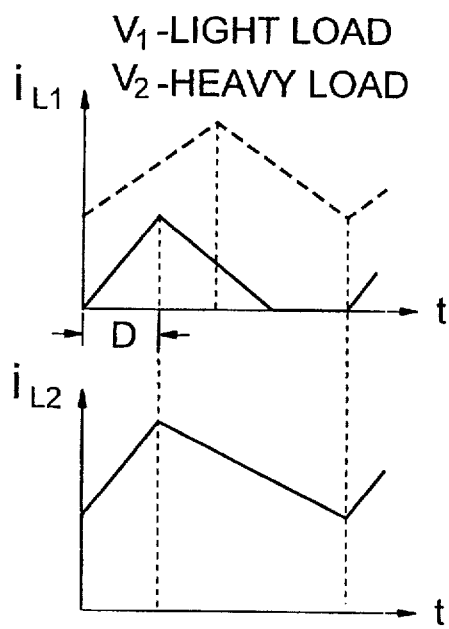
Figure 3C:
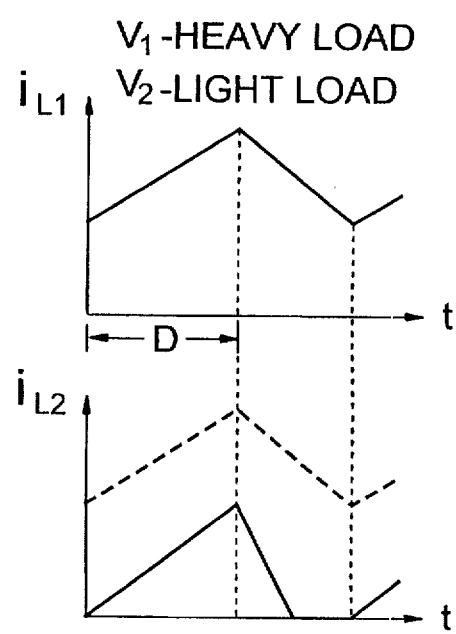
Figure 4:
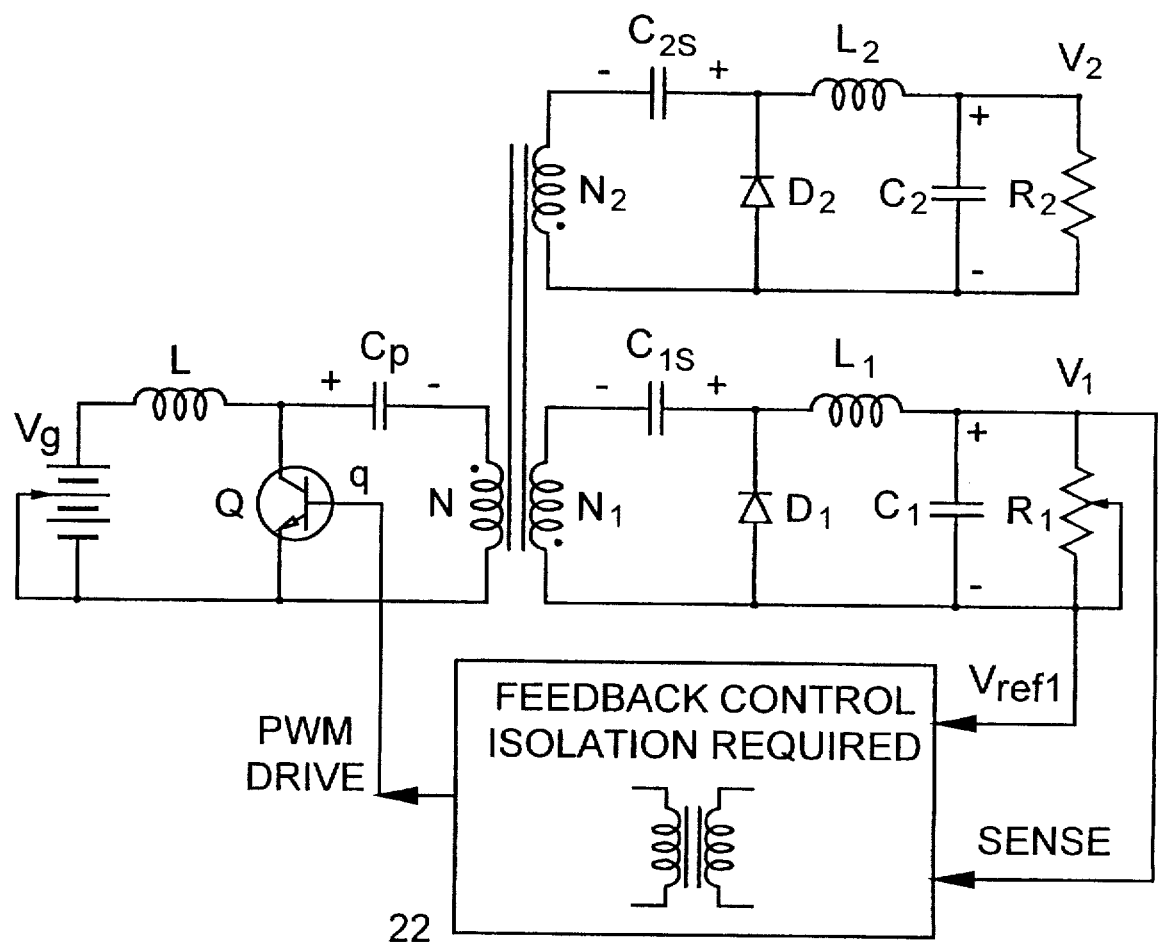
FIG. 4 displays the typical cross-regulation problems associated with all switching converters with multiple outputs.

One of the limitations of the prior art converter in FIG. 2 is in the transient voltage overshoot on the primary side active switch due to the energy storage in the transformer leakage inductance, which is dissipated in the converter and prevents its operation at higher switching frequency. The power loss due to energy stored in the parasitic inductance at the beginning of the turn OFF transition is given by $$P = L_{lk} I_p^2 f_s/2 \tag{3}$$

where $L_{lk}$ is the leakage inductance and $I_p$ is the peak current through inductor at the instant of turn OFF. Thus, for even moderate switching frequencies above 100 kHz, the power loss can be appreciable and degrade the overall efficiency substantially.

Figure 18:
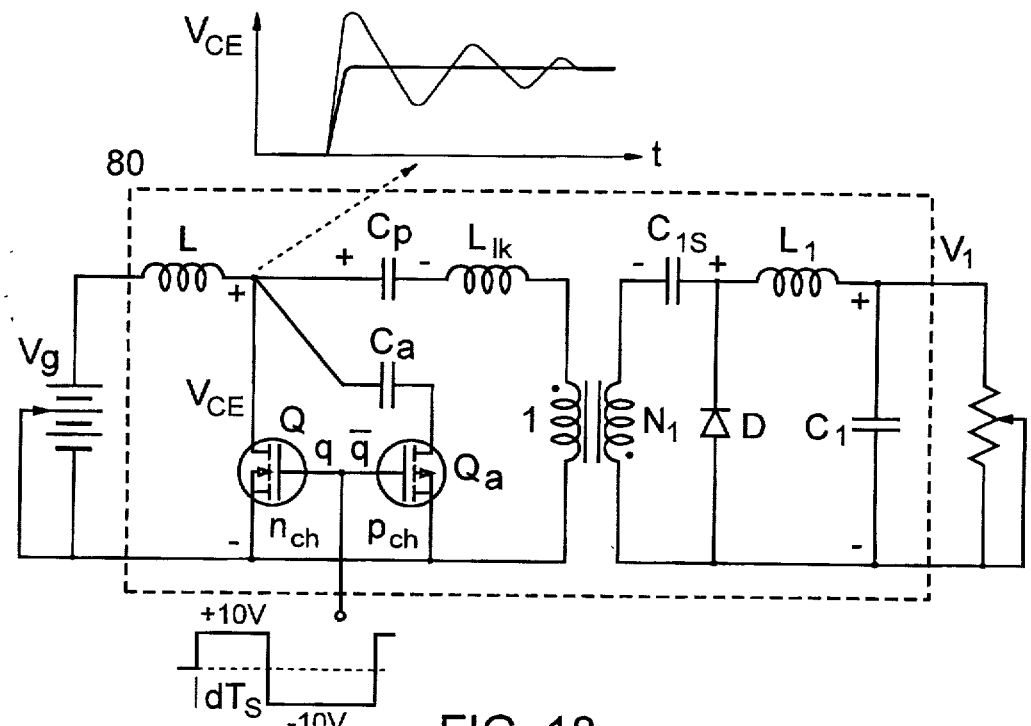
FIG. 18 illustrates the elimination of the voltage overshoot and losses due to leakage inductance of the transformer.

This major converter limitation is eliminated by the addition of the same auxiliary circuit $C_a$, $Q_a$. The energy stored on this leakage inductance is recirculated through the auxiliary branch instead of being dissipated as the loss. When the main active switch Q is turned OFF and the current through the primary energy transfer capacitor as well as the leakage inductance is reversed, the auxiliary branch with the auxiliary switch $Q_a$ turned ON is now providng an alternate path for the flow of current from the leakage inductance. Thus, the energy stored on the leakage inductance is transferred to the auxiliary capacitor $C_a$ and thus not lost dissipatively as before. As a result, the large voltage overshoot at the turn OFF of the primary side active switch is eliminated and smooth voltage waveform without overshoot is obtained as seen by the heavy lines on FIG. 18. The thin lines illustrate the voltage overshoot on transistor before the auxiliary circuit is added. The added auxiliary circuit thus plays a triple role: eliminates DICM mode of operation, enables simple primary side open-loop regulation and eliminates the problems associated with the transformer leakage inductance.

FIFTH PREFERRED EMBODIMENT

Figure 19A:
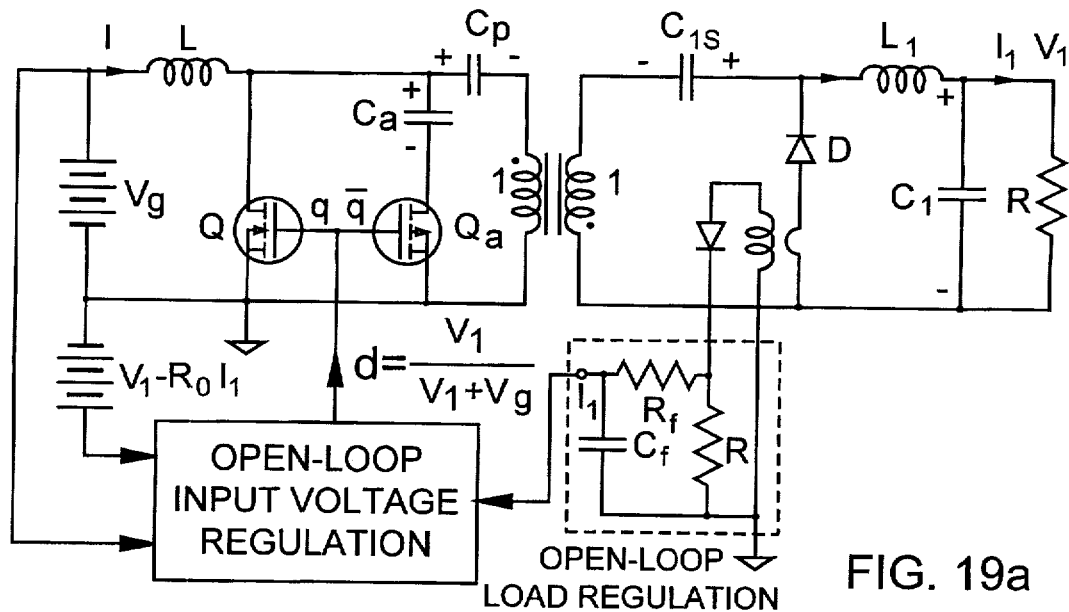
FIG. 19 depicts the addition of the open-loop load current regulation.
Figure 19B:
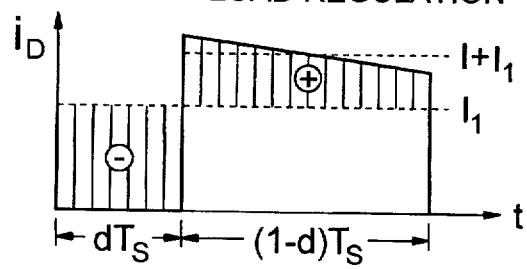

The output voltage is up to now regulated only against the changes of the input voltage. Although that is the major effect upon the output voltage, especially in highly efficient converters, the regulation against the load current changes is also highly desirable. This can also be achieved in an open-loop control manner by sensing the dc load current and referring this to the transformer primary side. This is most easily accomplished by use of the current sense transformer as in FIG. 19. By rectifying the obtained voltage waveform as seen in FIG. 19b the voltage proportional to the DC load current but sensed on the primary side is obtained. This can be then combined with the open-loop primary control to provide the necessary small correction in the duty ratio. Note that $R_o$ is the combined total parasitic resistance of the converter.

Figure 20:
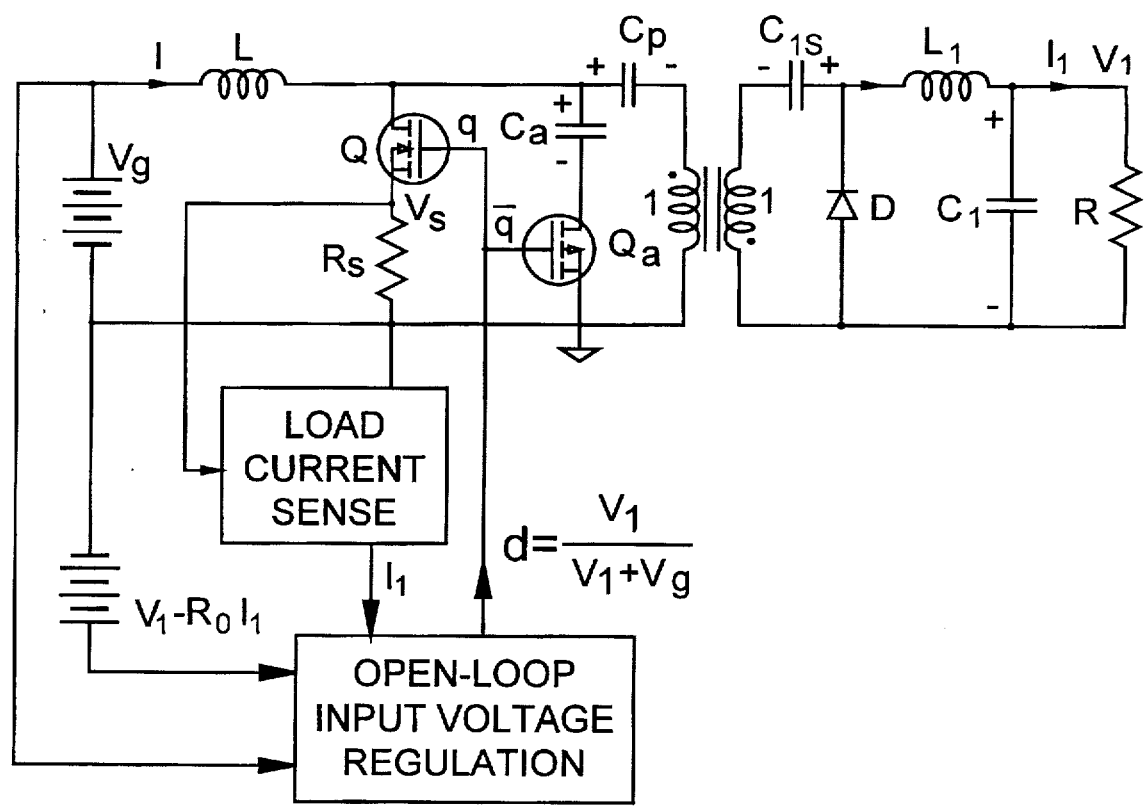
FIG. 20 represents an alternative open-loop realization.

An alternative implementation free of the problems associated with the current sense transformer is shown in FIG. 20 and FIG. 21 in which the input switch current waveform is sensed and than processed with a level shifter circuit of FIG. 21c to recreate the secondary side diode waveform. This signal is once again low pass filtered and inverted to result in a signal proportional to the DC load current. Another switching converter which exhibits the similar advantages is shown in FIG. 22.

EXPERIMENTAL VERIFICATION

The following two experiments were conducted to verify the key performance advantages of the present invention. The switching converter of FIG. 7 was built and tested. It was first tested with the p-channel switch removed, thus without the auxiliary circuit. The load current was reduced from 2 A to zero and the point where the converter changes from CICM to DICM mode of operation was noted, together with the corresponding output voltage, which was measured. The measurement results shown in the enclosed table show a wide variation of the output voltage from 13.69 V at full load to 25.5 V at 0.2 A load. In particular, note the sudden increase of the output voltage at the point of change-over from CICM to DICM mode when the voltage changes from 14.32 V to 25.5 V, or approximately 10 V. Note also that the measurements were not made at no load since the output voltage would increase without bound.

In the next test, the auxiliary p-channel switch was added and the same experiment repeated and output voltage measured. The data enclosed in the Table show almost constant output voltage ranging from 13.7 V to 15.5 V variation. In particular, the converter was observed to operate in CICM mode for all currents. In particular at no load the converter was operated safely at 15.5 V. Without this p-channell switch and auxiliary capacitor addition the output voltage would be much higher.

Another test was made to qualitatively and quantitatively verify the elimination of the loss due to leakage inductance of the transformer. Both the characteristic waveforms and measurement data are enclosed in FIG. 23. Note that the inclusion of a 2.3 µH leakage inductance resulted in this 25 W, 100 kHz converter prototype in a loss of 7.78 W. and the overall efficiency of 81.8%.

The inclusion of the auxiliary switch with p channel switch resulted in total losses of 2.99 W for a reduction of 4.77 W and overall efficiency improvement to 89.3%. Note also the complete elimination of the ringing on the transitor. However, the ringing on the output diode is still present, since it is due to the diode capacitance and the leakage inductance on the secondaruy side. However, because the diode current is zero when the diode turns OFF, the energy stored in this ringing is relatively small and can be neglected.

| TEST RESULTS | | | | | | | |
|---|---|---|---|---|---|---|---|
| Without P-channel MOSFET | | | | | | | |
| $I_{out}[A]$ | 0.20 | 0.30 | 0.40 | 0.43 | 0.50 | 1.00 | 2.00 |
| $V_{out}[V]$ | 25.5 | 22.2 | 14.42 | 14.32 | 14.28 | 14.07 | 13.69 |
| DICM⇔CICM With P-channel MOSFET | | | | | | | | |
| $I_{out}[A]$ | 0.00 | 0.10 | 0.20 | 0.30 | 0.40 | 0.43 | 0.50 | 1.00 | 2.00 |
| $V_{out}[V]$ | 15.50 | 14.54 | 14.45 | 14.39 | 14.33 | 14.32 | 14.31 | 14.08 | 13.70 |

We claim:

1. A dc-to-dc switching converter having an isolation transformer and means on the primary side of said isolation transformer for regulating against any changes in the input voltage from a dc voltage source and against load current changes comprising:

- a power processing stage having: a dc voltage source in series with an input inductor and a first energy transferring capacitor in series with the primary winding of said isolation transformer in that sequence, and a main current bidirectional switch connecting a junction of said input inductor and said first energy transfer capacitor to the return current path of said primary winding to said dc voltage source, and an auxiliary current bidirectional switch and auxiliary capacitor in a series circuit connected in parallel with said main current bidirectional switch; a second energy transferring capacitor, output inductor and load connected in series between the secondary winding of said isolation transformer and the return current path from said load to said secondary winding, a filter capacitor in parallel with said load, and a diode rectifier connecting the junction between said second energy transferring capacitor and said output inductor to said return current path from said load;
- a reference voltage source for setting desired input voltage level for operation of said dc-to-dc converter;
- control means for alternately switching said main and auxiliary current bidirectional switches on and off out of phase at a fixed frequency and regulated duty ratio such that while either one is on the other is off, means isolated from said secondary side for sensing load current and means responsive to said sensing means for varying said reference voltage as a function of load current;
- open-loop regulation means for comparing said input voltage to said reference voltage after it has been varied; and
- means for varying said duty ratio as a function of the ratio of the varied reference voltage and the sum of said reference voltage and said input voltage from said dc voltage source, to achieve open-loop input voltage regulation against any changes in the input voltage and load current changes.

2. A dc-to-dc switching converter as defined in claim 1 wherein said control means for alternately switching said main and auxiliary current bidirectional switches on and off at a fixed frequency and out of phase with a regulated duty ratio comprises means for continually summing said reference voltage and said input voltage to obtain an auxiliary voltage, and means for producing a sawtooth waveform with a ramp determined by the amplitude of said auxiliary voltage and the period of said fixed switching frequency, and said duty ratio of switching pulses applied to said main and auxiliary current bidirectional switches comprises a comparator that produces a switching pulse of a width determined by the time required for the ramp of said sawtooth waveform to exceed in amplitude said reference voltage during each fixed frequency switching cycle.

3. A dc-to-dc switching converter as defined in claim 1 wherein said isolation transformer has a plurality of secondary windings, one for each of a plurality of loads, each of said plurality of loads having a separate filter capacitor connected in parallel, and separate series circuit comprising a second transfer capacitor and output inductor connected between a separate one of said plurality of secondary windings and said load, and a separate diode rectifier connected between said second energy transfer capacitor and said output inductor for each of said plurality of loads.

4. A dc-to-dc switching converter as defined in claim 3 wherein said control means for alternately switching said main and auxiliary current bidirectional switches on and off at a fixed frequency and out of phase with a regulated duty ratio comprises means for continually summing said reference voltage and said input voltage to obtain an auxiliary voltage, and means for producing a sawtooth waveform with a ramp determined by the amplitude of said auxiliary voltage and the period of said fixed switching frequency, and said duty ratio of switching pulses applied to said main and auxiliary current bidirectional switches comprises a comparator that produces a switching pulse of a width determined by the time required for the ramp of said sawtooth waveform to exceed in amplitude said reference voltage during each fixed frequency switching cycle, and wherein said reference voltage is multiplied by the turns ratio of the primary winding of said isolation transformer and the secondary winding for one of said plurality of loads, and the product is then used as a reference voltage for said duty ratio regulation.

5. A dc-to-dc switching converter as defined in claim 1 including integrated magnetics coupling said input and output inductances and said primary and secondary windings on a common core with a small air gap.

6. A dc-to-dc switching converter as defined in claim 1 including a separate inductor connected in series between said first energy transfer capacitor and the primary winding of said isolation transformer for elimination of voltage overshoot during switching on of current and losses due to leakage inductance of said isolation transformer.

7. A dc-to-dc switching converter as defined in claim 1 wherein the winding sense of said secondary winding is reversed and said diode rectifier and output inductor are interchanged in position.

8. A dc-to-dc switching converter as defined in claim 7 including a plurality of loads and a plurality of secondary windings, one for each load, for coupling power from said primary winding of said isolation transformer to each load individually, each secondary winding including a like circuit between it and its associated load.

9. A dc-to-dc switching converter having an isolation transformer and means on the primary side of said isolation transformer for regulating against input voltage changes from a dc voltage source and against load current changes comprising:

- a power processing stage having: a dc voltage source in series with an input inductor and a first energy transferring capacitor in series with the primary winding of said isolation transformer in that sequence, and a main current bidirectional switch connecting a junction of said input inductor and said first energy transfer capacitor to the return current path of said primary winding to said dc voltage source, and an auxiliary current bidirectional switch and auxiliary capacitor in a series circuit connected in parallel with said main current bidirectional switch; a second energy transferring capacitor, output inductor and load connected in series between the secondary winding of said isolation transformer and the return current path from said load to said secondary winding, a filter capacitor in parallel with said load, and a diode rectifier connecting the junction between said second energy transferring capacitor and said output inductor to said return current path from said load;
- a reference voltage source for setting desired input voltage level for operation of said dc-to-dc converter;
- control means for alternately switching said main and auxiliary current bidirectional switches on and off out of phase at a fixed frequency and regulated duty ratio such that while either one is on the other is off, with open-loop regulation means for comparing said input voltage to said reference voltage and varying said duty ratio as a function of the ratio of said reference voltage and the sum of said reference voltage and said input voltage from said dc voltage source, whereby open-loop input voltage regulation is achieved, further including a current sensing transformer in series with said diode rectifier in the secondary side of said isolation transformer for sensing load current and means for producing from said load current sensed a signal proportional to load current sensed, and means for rectifying said signal proportional to load current sensed to obtain a proportional voltage signal and referring said proportional voltage signal to said open-loop input voltage regulation means on the primary side of said isolation transformer where it is combined with said reference voltage for regulation of said duty ratio as a function of changes in load current.

10. A dc-to-dc switching converter having an isolation transformer and means on the primary side of said isolation transformer for regulating against input voltage changes from a dc voltage source and against load current changes comprising:

- a power processing stage having: a dc voltage source in series with an input inductor and a first energy transferring capacitor in series with the primary winding of said isolation transformer in that sequence, and a main current bidirectional switch connecting a junction of said input inductor and said first energy transfer capacitor to the return current path of said primary winding to said dc voltage source, and an auxiliary current bidirectional switch and auxiliary capacitor in a series circuit connected in parallel with said main current bidirectional switch; a second energy transferring capacitor, output inductor and load connected in series between the secondary winding of said isolation transformer and the return current path from said load to said secondary winding, a filter capacitor in parallel with said load, and a diode rectifier connecting the junction between said second energy transferring capacitor and said output inductor to said return current path from said load;

- a reference voltage source for setting desired input voltage level for operation of said dc-to-dc converter;

- control means for alternately switching said main and auxiliary current bidirectional switches on and off out of phase at a fixed frequency and regulated duty ratio such that while either one is on the other is off, with open-loop regulation means for comparing said input voltage to said reference voltage and varying said duty ratio as a function of the ratio of said reference voltage and the sum of said reference voltage and said input voltage from said dc voltage source, whereby open-loop input voltage regulation is achieved, including a series resistor connected between said main current bidirectional switch and said return current path to said input voltage source, and means connected to said series resistor for sensing a voltage signal proportional to load current to obtain a voltage signal proportional to load current and direct connection means for referring said proportional voltage signal to said open-loop input voltage regulation means for regulation of said duty ratio as a function of changes in load current.

* * * * *